US009400551B2

(12) United States Patent
Ashbrook et al.

(10) Patent No.: US 9,400,551 B2
(45) Date of Patent: Jul. 26, 2016

(54) PRESENTATION OF A NOTIFICATION BASED ON A USER'S SUSCEPTIBILITY AND DESIRED INTRUSIVENESS

(71) Applicant: Nokia Technologies Oy, Espoo (FI)

(72) Inventors: Daniel L. Ashbrook, Sunnyvale, CA (US); David H. Nguyen, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 76 days.

(21) Appl. No.: 13/630,929

(22) Filed: Sep. 28, 2012

(65) Prior Publication Data

US 2014/0096076 A1   Apr. 3, 2014

(51) Int. Cl.
*G06F 3/048* (2013.01)
*G06F 3/01* (2006.01)
*G06F 3/0481* (2013.01)

(52) U.S. Cl.
CPC .............. *G06F 3/013* (2013.01); *G06F 3/0481* (2013.01)

(58) Field of Classification Search
CPC ........ G06F 3/048; G06F 3/0481; G06F 3/013
USPC .......................................... 715/808; 351/209
See application file for complete search history.

(56) References Cited

U.S. PATENT DOCUMENTS

| | | | | |
|---|---|---|---|---|
| 6,601,012 | B1* | 7/2003 | Horvitz et al. | 702/150 |
| 8,566,413 | B2* | 10/2013 | Horvitz | 709/207 |
| 2004/0183749 | A1* | 9/2004 | Vertegaal | 345/7 |
| 2009/0007168 | A1* | 1/2009 | Finamore | 725/12 |
| 2009/0141895 | A1* | 6/2009 | Anderson et al. | 380/252 |
| 2009/0204927 | A1* | 8/2009 | Terasaki | 715/781 |
| 2010/0058231 | A1* | 3/2010 | Duarte et al. | 715/800 |
| 2011/0267374 | A1* | 11/2011 | Sakata et al. | 345/672 |

(Continued)

FOREIGN PATENT DOCUMENTS

| | | |
|---|---|---|
| EP | 2 325 722 A1 | 5/2011 |
| WO | WO 2010/062481 A1 | 1/2010 |
| WO | WO 2012/027192 A1 | 3/2012 |

OTHER PUBLICATIONS

Costanza, E. et al., *eye-q: Eyeglass Peripheral Display for Subtle Intimate Notifications,* Proceedings of Conference on Human-Ccomputer Interaction With Mobile Devices and Services, Mobile HCI 2006, (Sep. 2006), 8 pages.

(Continued)

*Primary Examiner* — Jennifer To
*Assistant Examiner* — John Repsher, III
(74) *Attorney, Agent, or Firm* — Alston & Bird LLP

(57) ABSTRACT

Methods, apparatuses, and computer program products are herein provided for causing presentation of a notification on a display based on the user's susceptibility to notice the notification and the desired intrusiveness of the presentation of the notification. A method may include determining that a notification should be presented to a user on a display. The method further includes determining a susceptibility level pertaining to the likelihood the user will notice the notification. The method further includes causing presentation of the notification on the display based at least in part on the susceptibility level and an intrusiveness level for presentation of the notification. The intrusiveness level pertains to how intrusive presentation of the notification should be to the user's experience. Corresponding apparatuses and computer program products are also provided.

5 Claims, 23 Drawing Sheets

(56) References Cited

U.S. PATENT DOCUMENTS

| | | | |
|---|---|---|---|
| 2012/0050142 A1 | 3/2012 | Border et al. | |
| 2012/0096398 A1* | 4/2012 | Greenspan et al. | 715/808 |
| 2012/0271484 A1* | 10/2012 | Feit et al. | 701/1 |
| 2013/0311925 A1* | 11/2013 | Denker et al. | 715/771 |
| 2013/0339214 A1* | 12/2013 | Buck | 705/37 |

OTHER PUBLICATIONS

Drewes, H., *Eye Gaze Tracking for Human Computer Interaction,* Dissertation for University of Munchen (2010), 166 pages.

Blind spot (vision) dated Aug. 11, 2012 [online] [retrieved Sep. 14, 2012]. Retrieved from the Internet: <URL: http://en.wikipedia.org/wiki/Blind_spot_(vision)>. 2 pages.

Journey through a Burning Mind >>The blind spot of the Human eye-find yours! Dated Sep. 5, 2008 [online] [retrieved Sep. 14, 2012]. Retrieved from the Internet: <URL: http://www.isaiadis.com/2008/12/05/the-blind-spot-of-the-human-eye-find-yours/>. 4 pages.

Drewes, H. et al., *Detailed Monitoring of User's Gaze and Interaction to Improve Future E-Learning* (undated) 10 pages.

Drewes, H., et al., *Eye-Gaze Interaction for Mobile Phones*(undated) 8 pages.

Drewes, H. et al., *Interacting With the Computer Using Gaze Gestures* (undated) 14 pages.

International Search Report and Written Opinion for Application No. PCT/FI2013/050883 dated Jan. 15, 2014.

Bristow, D. et al., *Two Distinct Neural Effects of Blinking on Human Visual Processing,* NeuroImage, vol. 27, No. 1 (Aug. 1, 2005) 136-145.

Roda, C., *Attention Support in Digital Environments. Nine Questions to be Addressed,* New Ideas in Psychology, vol. 28, No. 3, (Dec. 1, 2010) 354-364.

*User Notifications Based on Eye Tracking in Multiple Monitor Environments,* IP.com Journal, IPCOM000177505D, (Dec. 16, 2008) 2 pages.

* cited by examiner

PRESENTATION OF A NOTIFICATION BASED ON A USER'S SUSCEPTIBILITY AND DESIRED INTRUSIVENESS

TECHNOLOGICAL FIELD

Example embodiments of the present invention relate generally to user interface technology and, more particularly, relate to methods, apparatuses, and computer program products for causing presentation of a notification on a display based on the user's susceptibility to notice the notification and the desired intrusiveness of the presentation of the notification.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

BRIEF SUMMARY

Increased functionality of these mobile computing devices has led to users being able to perform multiple operations on one device. Each of these operations may have corresponding notifications that may be presented to the user. For example, on just one device, a user may receive notifications for a new email message, an incoming phone call, a task reminder, among others. While these notifications may be helpful, they may be overwhelming and even disruptive of the user's current task. Moreover, some notifications may be more important or urgent than others. These problems may be compounded with the use of pass-through displays (e.g., head-mounted displays, augmented reality glasses, etc.).

As such, embodiments of the present invention seek to control presentation of the notifications based on the user's susceptibility to notice the notification and the desired intrusiveness of the notification. In some example embodiments, a device may be configured to monitor the user's eyes, such as through gaze tracking, to determine the user's susceptibility level (e.g., the likelihood the user will notice the notification). In some example embodiments, the device may determine when the user's eyes are moving or blinking, and may present the notification during that time to cause presentation of the notification in a non-intrusive manner. Similarly, the device may monitor the position of the user's eyes and determine a position of the display that corresponds to a blind spot of the user's eyes. In such an example embodiment, the device may present the notification in that position to cause presentation of the notification in a non-intrusive manner. In such cases, the user may more gradually become aware of the notification without losing a certain amount of concentration on their current task.

Conversely, in some example embodiments, the device may cause presentation of the notification at a time that is not while the user's eyes are moving or blinking to cause presentation of the notification in an intrusive manner. Along these same lines, the device may cause presentation of the notification in a position that does not correspond to a blind spot of the user's eyes to present the notification in an intrusive manner. In such a manner, the intrusiveness of the notification can be increased to alert the user to the notification.

Embodiments of the present invention provide methods, apparatuses, and computer program products for causing presentation of a notification on a display based on the user's susceptibility to notice the notification and the desired intrusiveness of the presentation of the notification. In one example embodiment, a method includes determining that a notification should be presented to a user on a display. The method further includes determining a susceptibility level pertaining to the likelihood the user will notice the notification. The method further includes causing presentation of the notification on the display based at least in part on the susceptibility level and an intrusiveness level for presentation of the notification. The intrusiveness level pertains to how intrusive presentation of the notification should be to the user's experience. Additionally, in some embodiments, the method further comprises identifying the intrusiveness level for presentation of the notification.

In some embodiments, the method may further include determining the susceptibility level by determining that the user has a low susceptibility level such that there is a low likelihood that the user will notice the notification. Additionally, the method may further include determining that the user has a low susceptibility level by determining at least one of: that the user's eyes are moving; that the user's eyes are blinking; or that the user's eyes have a blind spot that corresponds to at least one position on the display. Additionally, in some embodiments, the method further includes causing presentation of the notification by causing presentation of the notification on the display while the user has the low susceptibility level in an instance in which the intrusiveness level of the notification is below a pre-determined intrusiveness level threshold. In some embodiments, the method may further include causing presentation of the notification by causing presentation of the notification at a time concurrent with the user having the low susceptibility level.

In some embodiments, the method may further include determining the susceptibility level by determining that the user has a high susceptibility level such that there is a high likelihood that the user will notice the notification. In some embodiments, the method may further include causing presentation of the notification by causing presentation of the notification on the display while the user's eyes are not moving in an instance in which the intrusiveness level of the notification is above a pre-determined intrusiveness level threshold. In some embodiments, the method may further include causing presentation of the notification by causing presentation of the notification on the display while the user's eyes are not blinking in an instance in which the intrusiveness level of the notification is above a pre-determined intrusiveness level threshold. In some embodiments, the method may further include causing presentation of the notification by causing presentation of the notification on the display in a position on the display that does not correspond to the blind spot of the user's eyes in an instance in which the intrusiveness level of the notification is above a pre-determined intrusiveness level threshold.

In another example embodiment, an apparatus comprises at least one processor and at least one memory storing computer program code, wherein the at least one memory and stored computer program code are configured, with the at least one processor, to cause the apparatus to determine that a notification should be presented to a user on a display. The at least one memory and stored computer program code are configured, with the at least one processor, to further cause the apparatus to determine a susceptibility level pertaining to the likelihood the user will notice the notification. The at least one memory and stored computer program code are configured, with the at least one processor, to further cause the apparatus to cause presentation of the notification on the display based at least in part on the susceptibility level and an intrusiveness level for presentation of the notification. The intrusiveness level pertains to how intrusive presentation of the notification should be to the user's experience.

In another example embodiment, a computer program product is provided that includes at least one computer-readable storage medium having computer-readable program instructions stored therein. The program instructions of this example embodiment comprise program instructions configured to cause an apparatus to perform a method comprising determining that a notification should be presented to a user on a display. The method further includes determining a susceptibility level pertaining to the likelihood the user will notice the notification. The method further includes causing presentation of the notification on the display based at least in part on the susceptibility level and an intrusiveness level for presentation of the notification. The intrusiveness level pertains to how intrusive presentation of the notification should be to the user's experience.

In another example embodiment, an apparatus is provided that comprises means for determining that a notification should be presented to a user on a display. The apparatus further includes means for determining a susceptibility level pertaining to the likelihood the user will notice the notification. The apparatus further includes means for causing presentation of the notification on the display based at least in part on the susceptibility level and an intrusiveness level for presentation of the notification. The intrusiveness level pertains to how intrusive presentation of the notification should be to the user's experience.

BRIEF DESCRIPTION OF THE DRAWINGS

Figure 1:
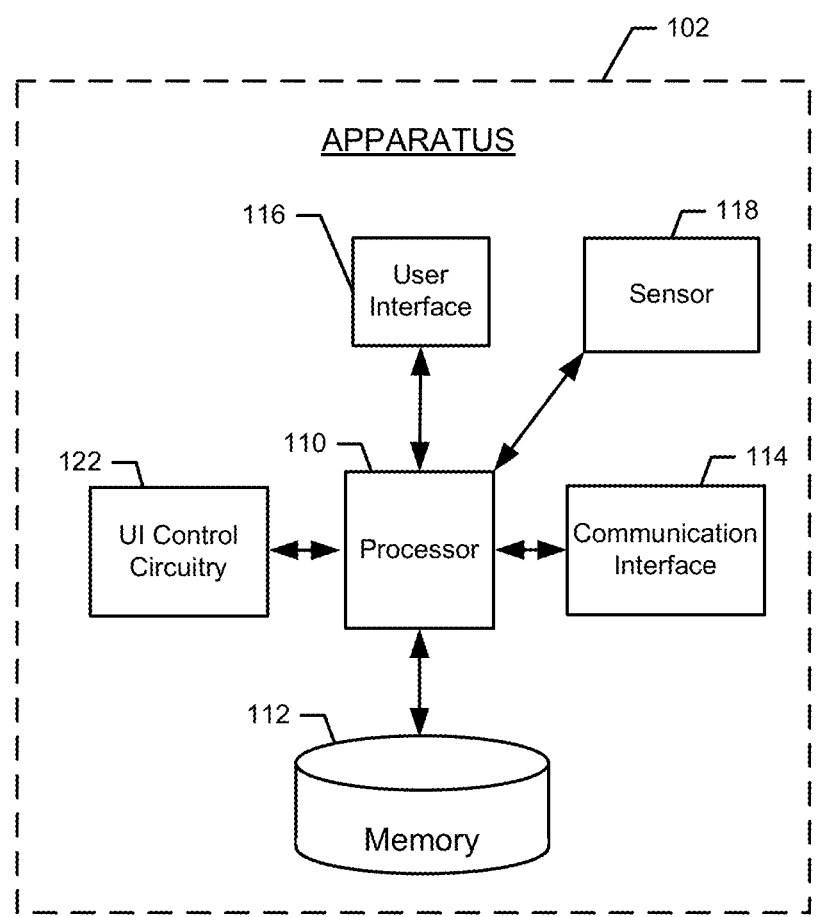
Figure 2:
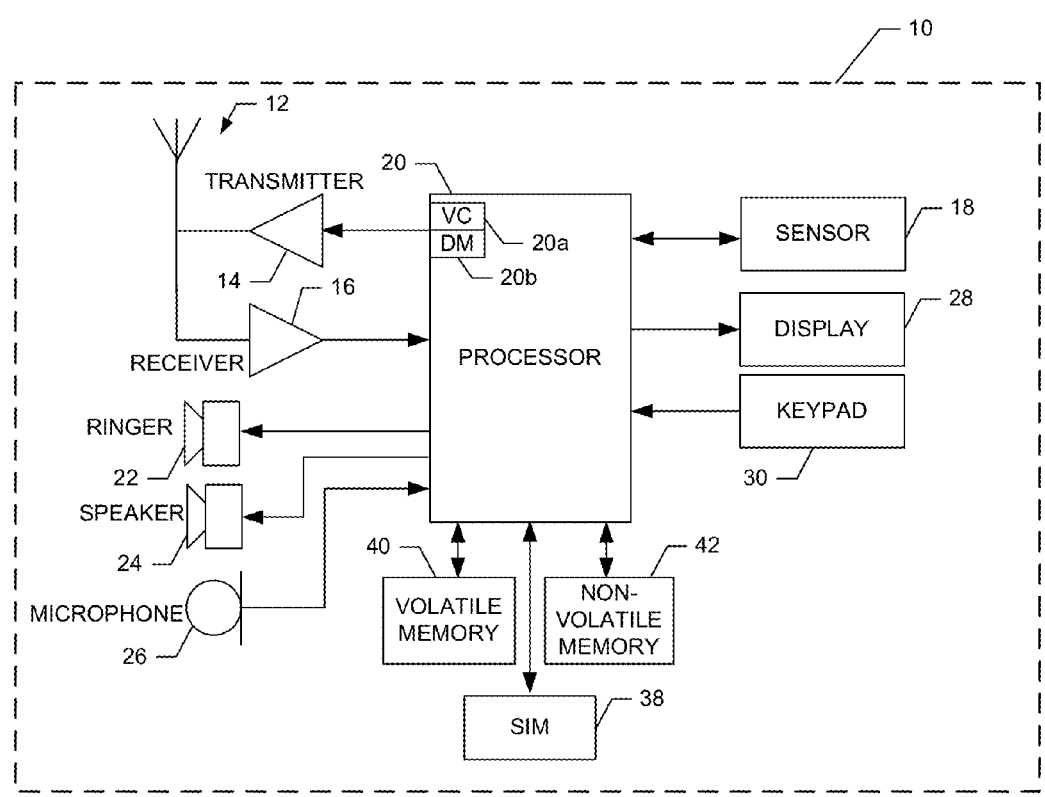
Figure 3A:
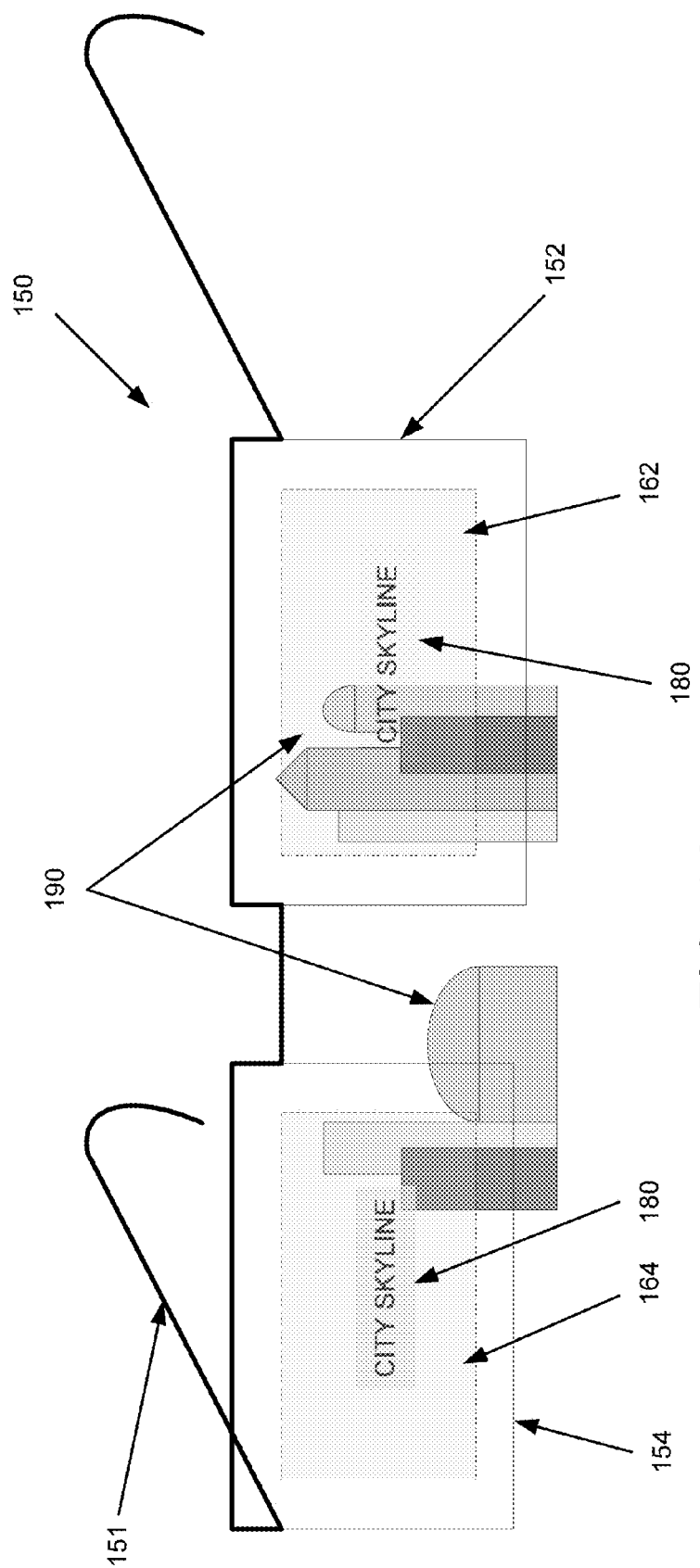
Figure 3B:
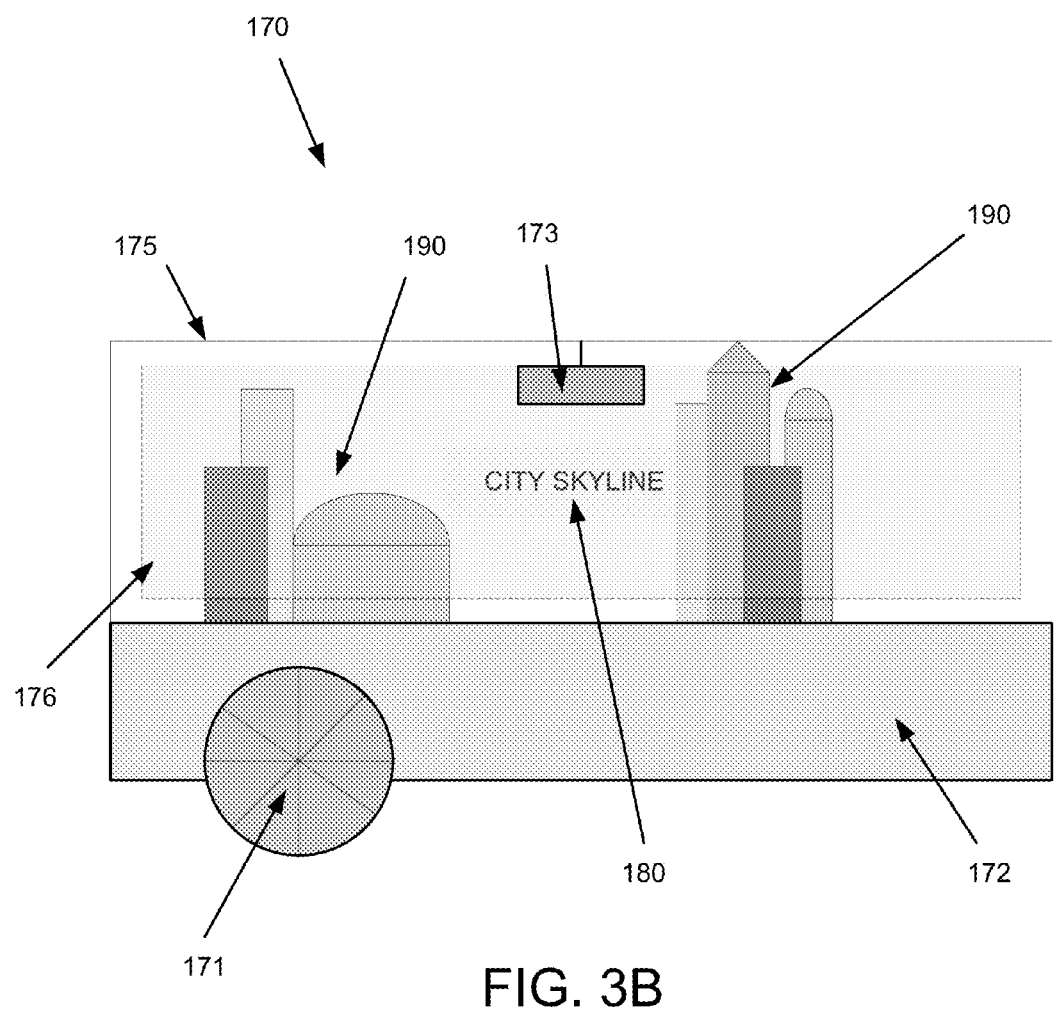
Figure 4A:
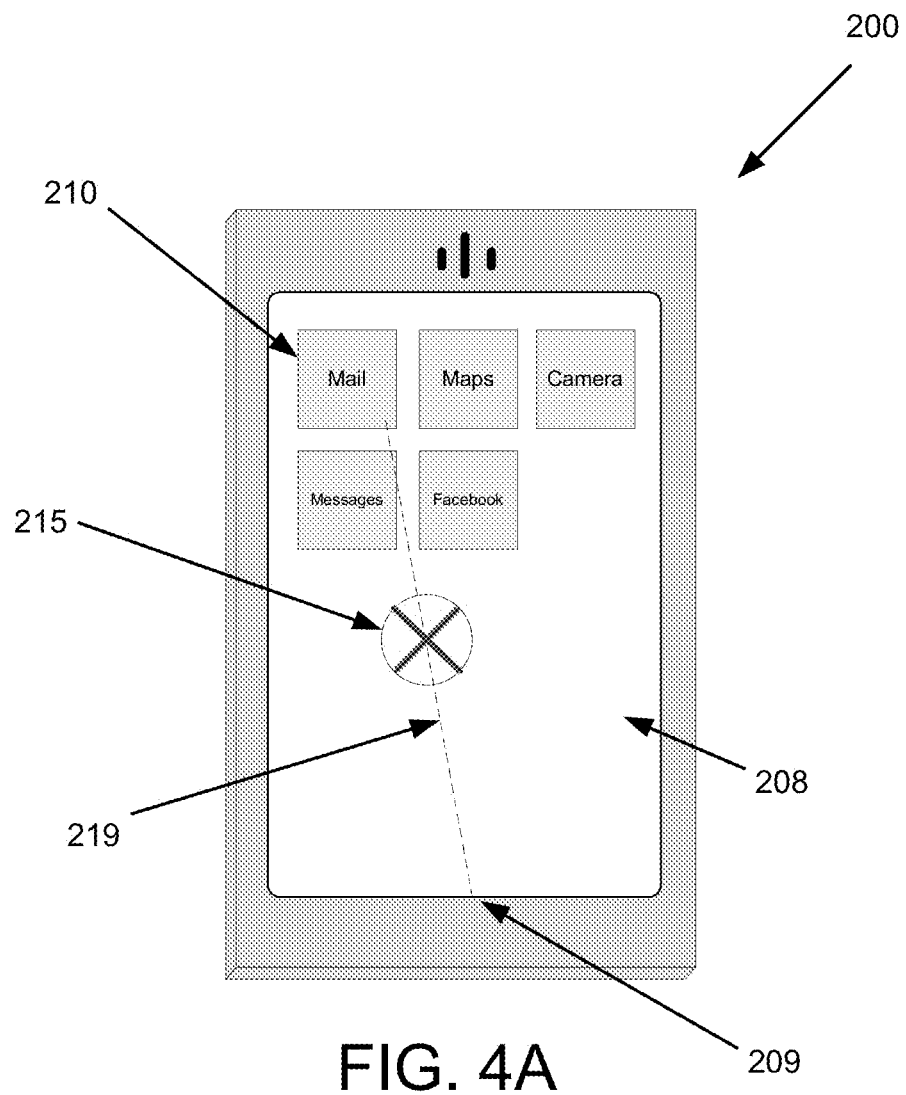
Figure 4B:
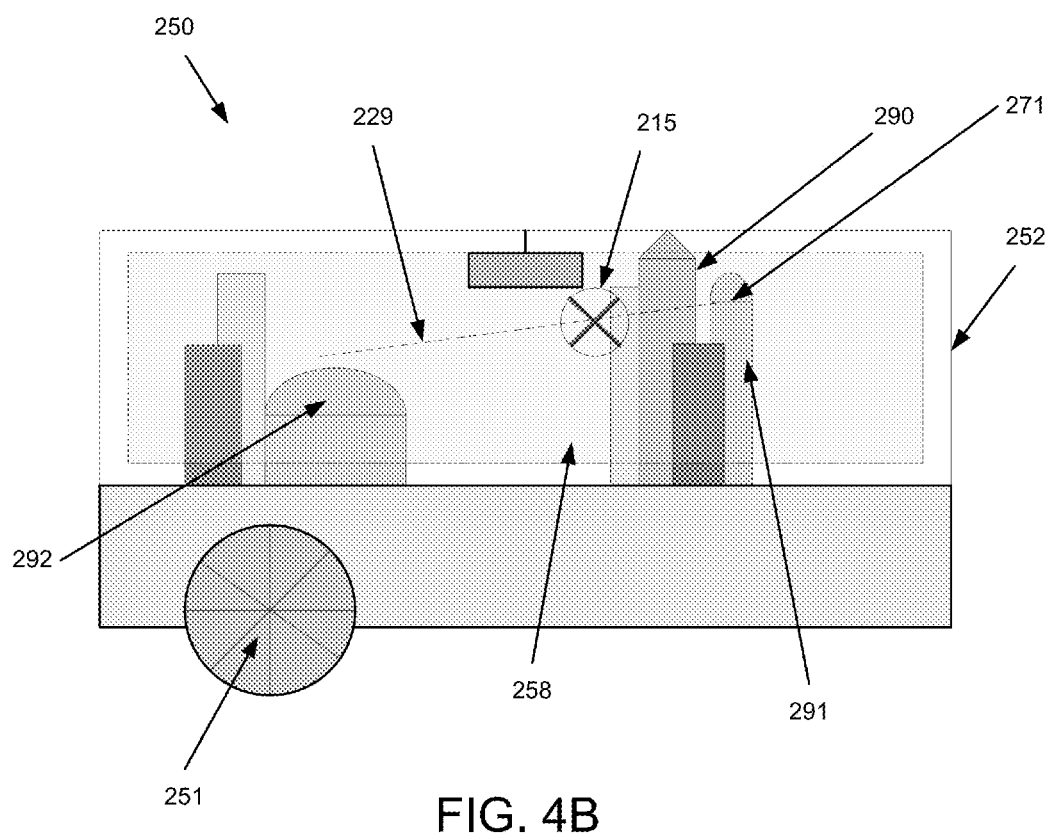
Figure 5A:
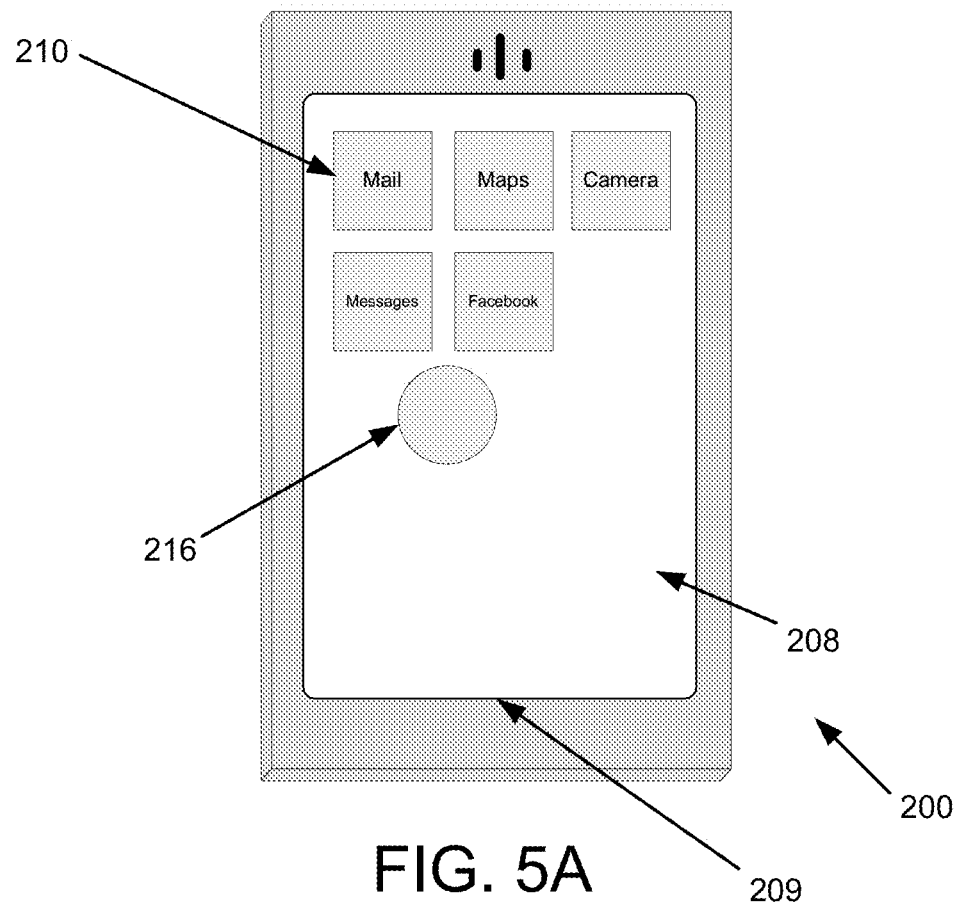
Figure 5B:
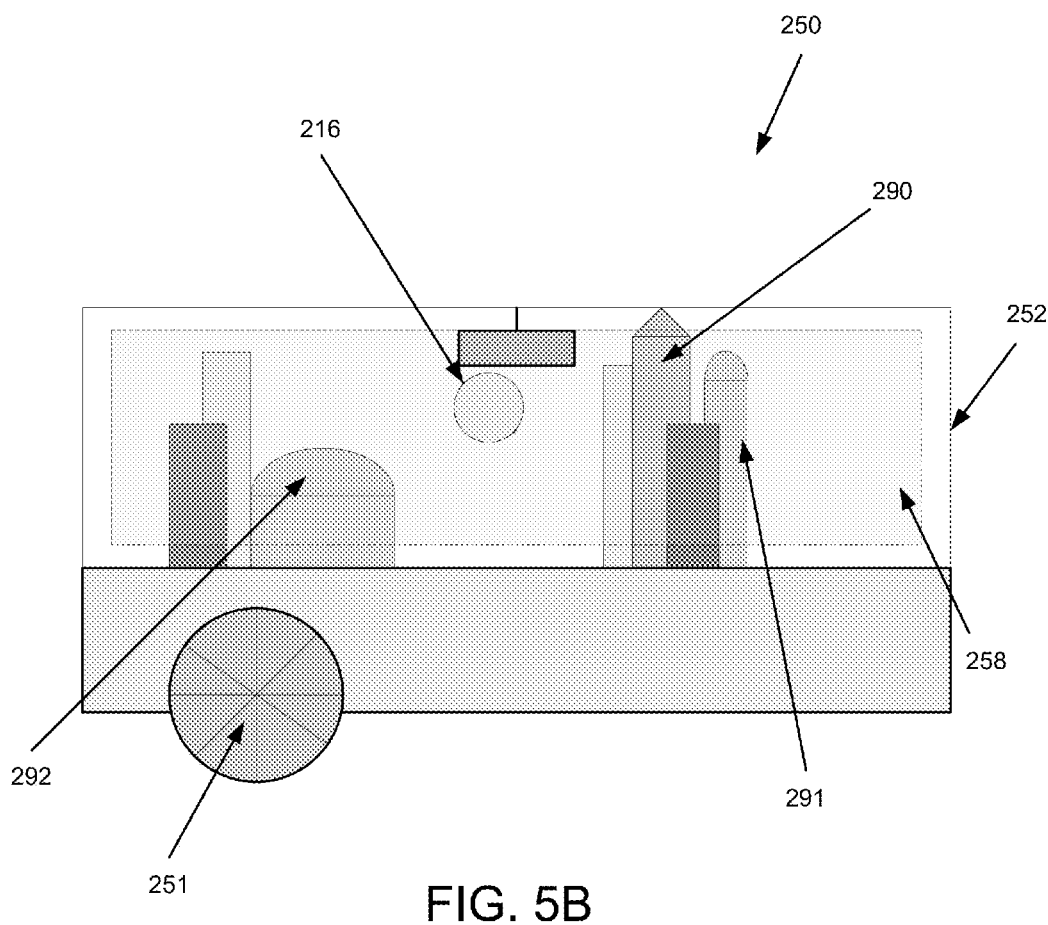
Figure 6A:
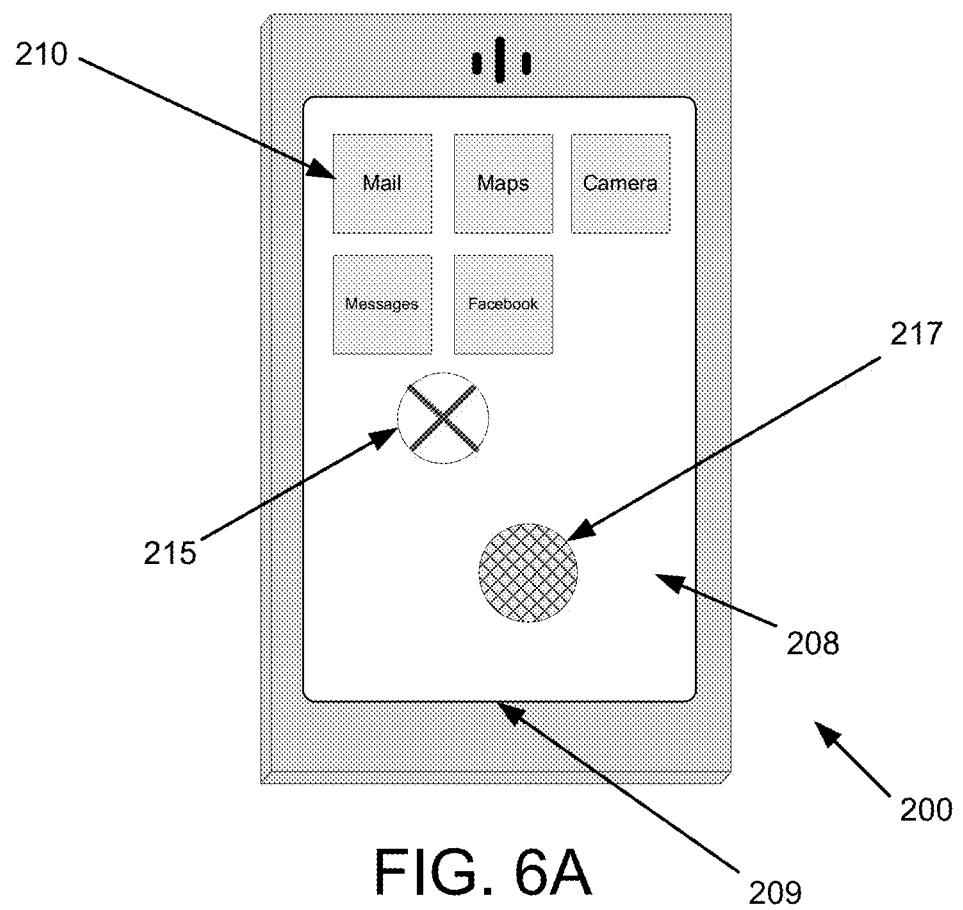
Figure 6B:
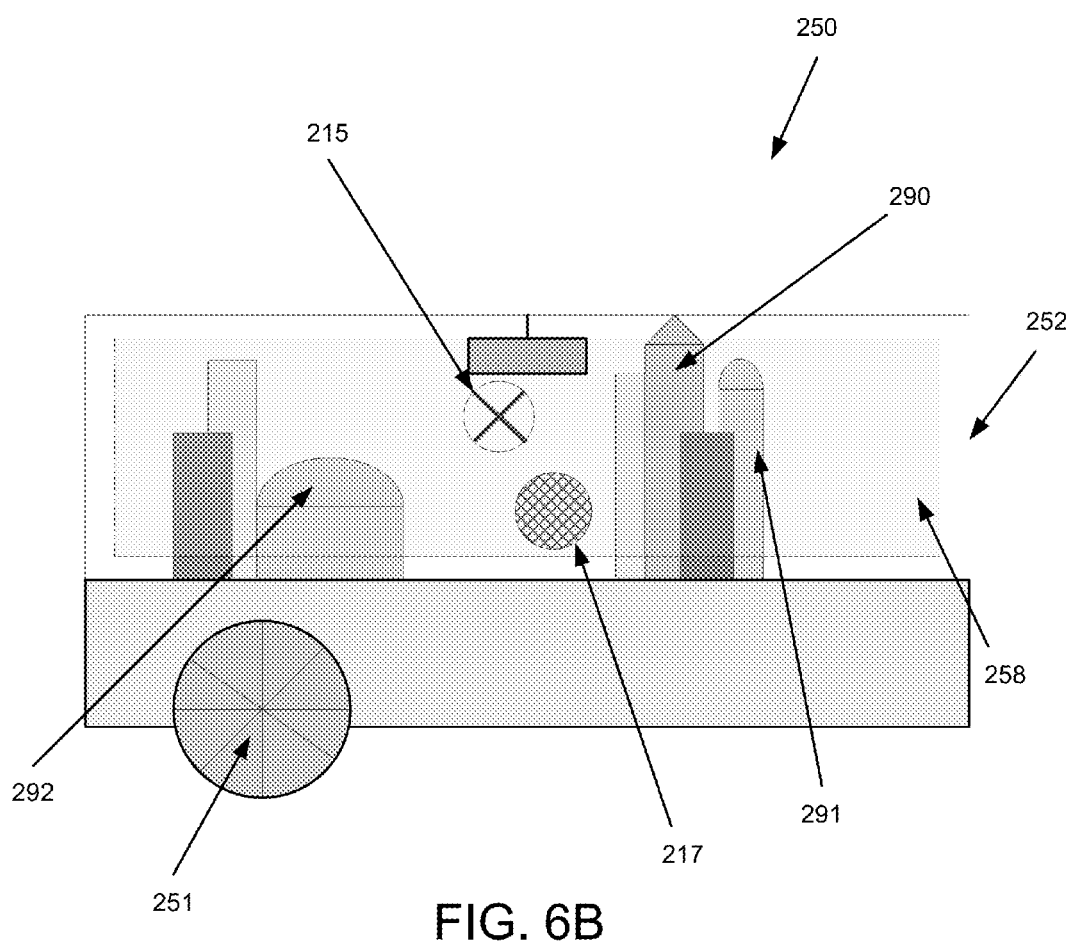
Figure 7A:
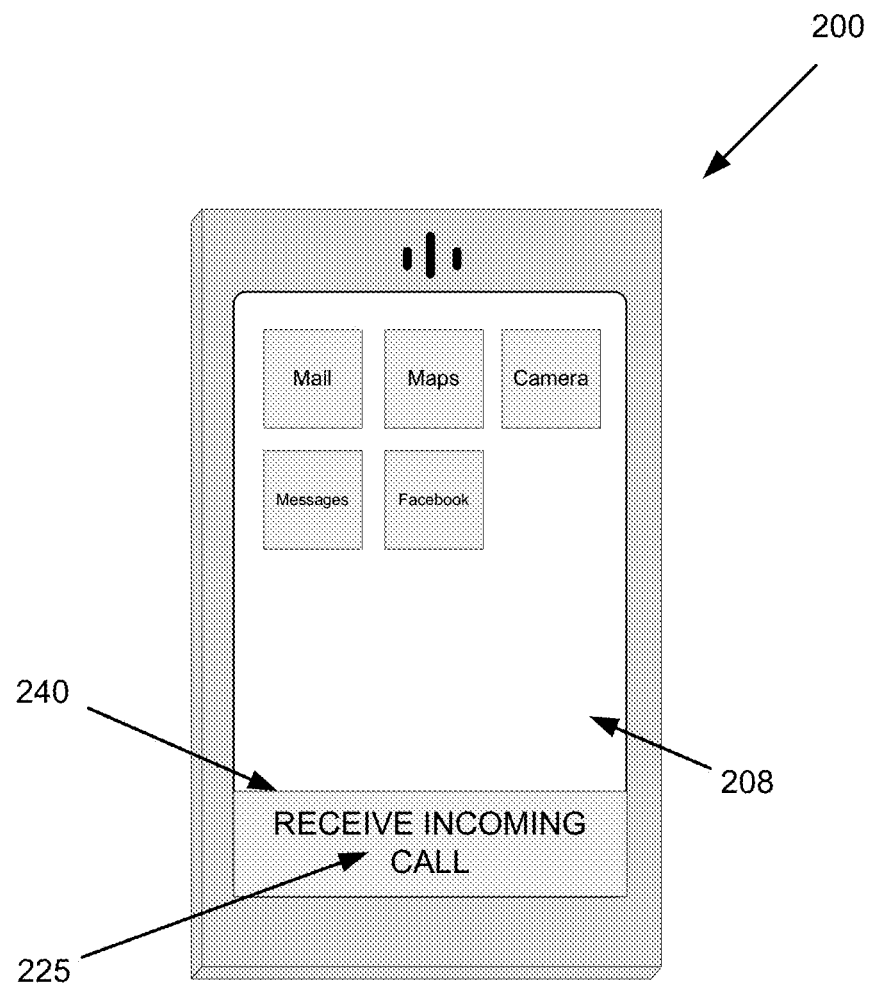
Figure 7B:
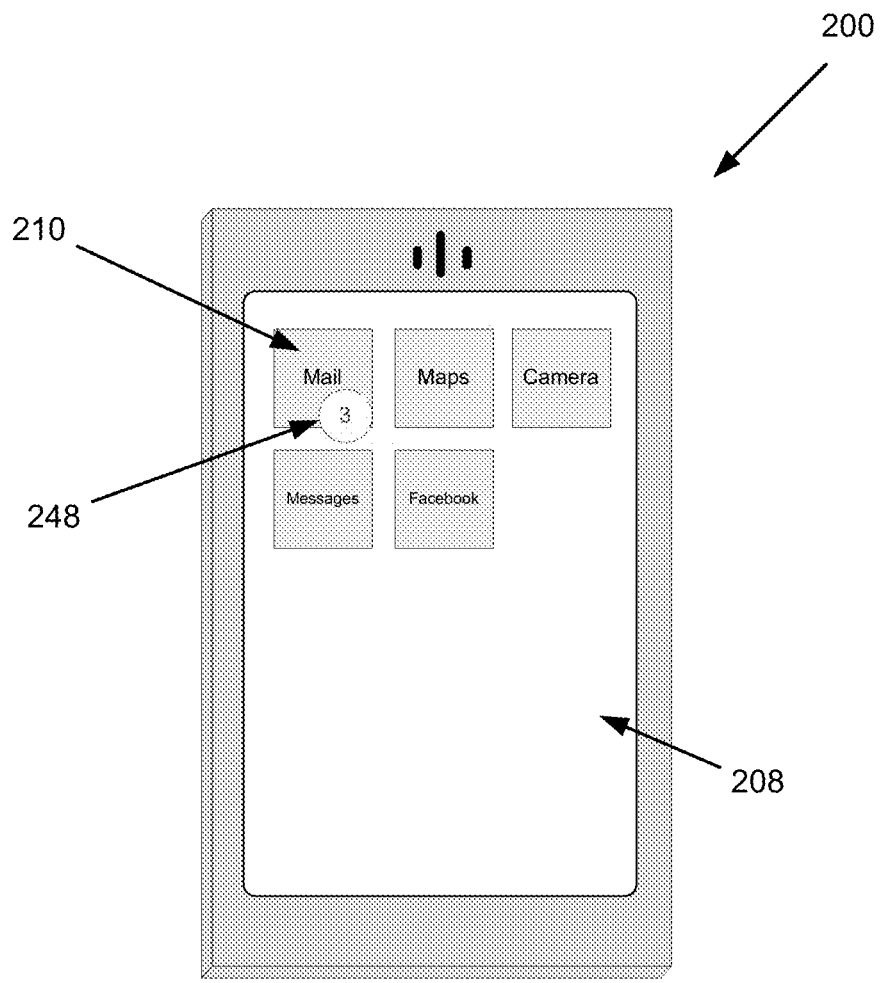
Figure 7C:
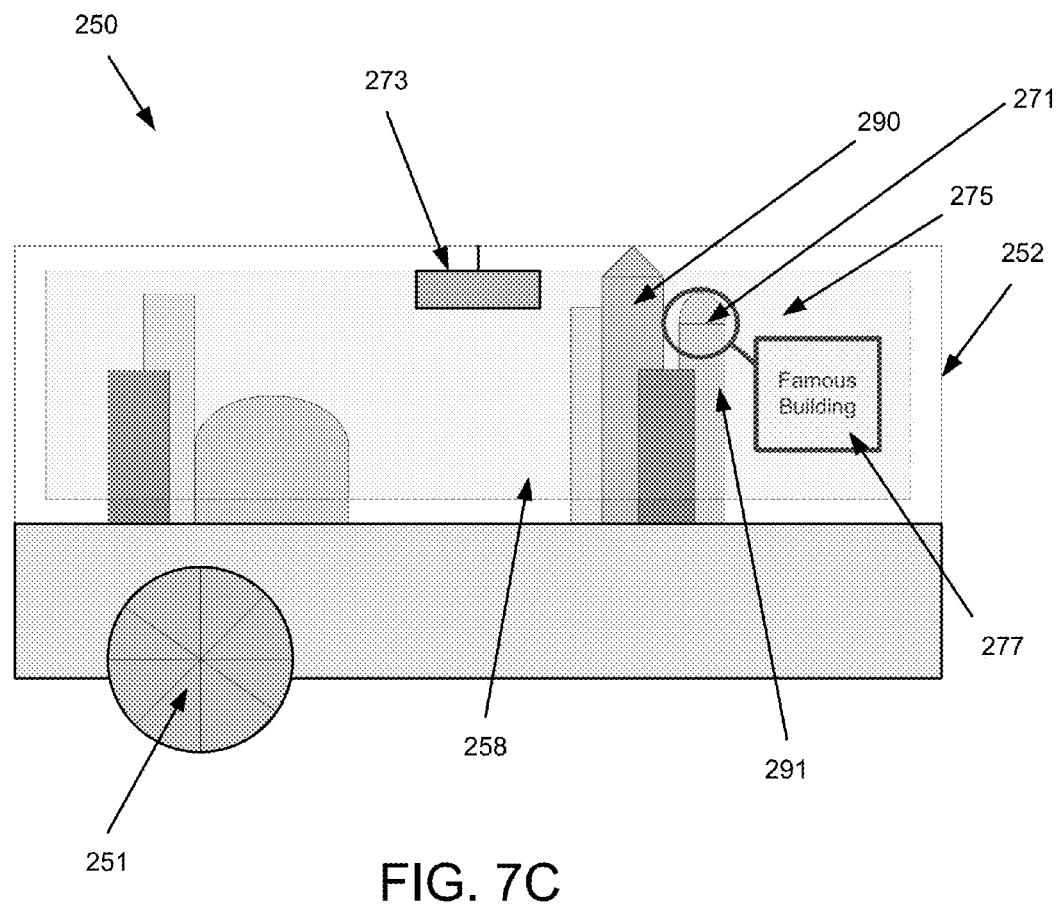
Figure 8A:
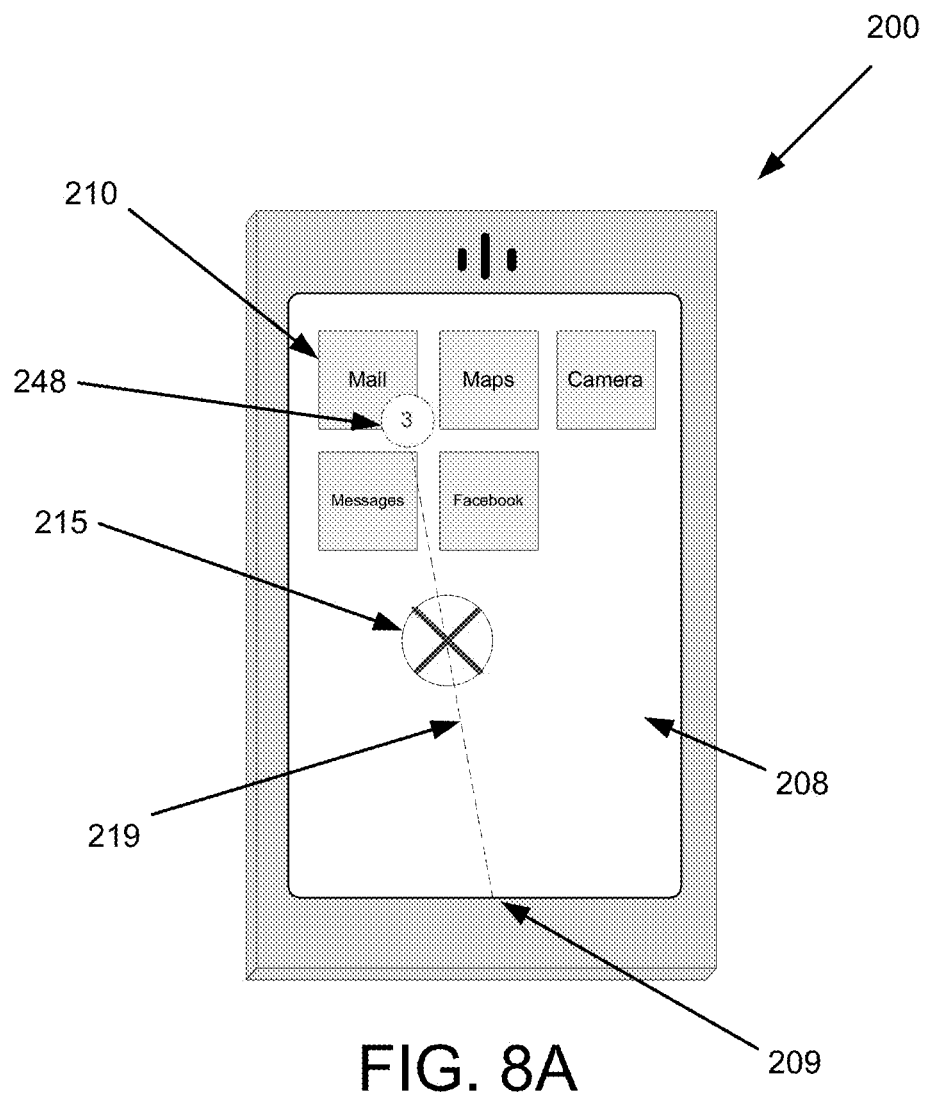
Figure 8B:
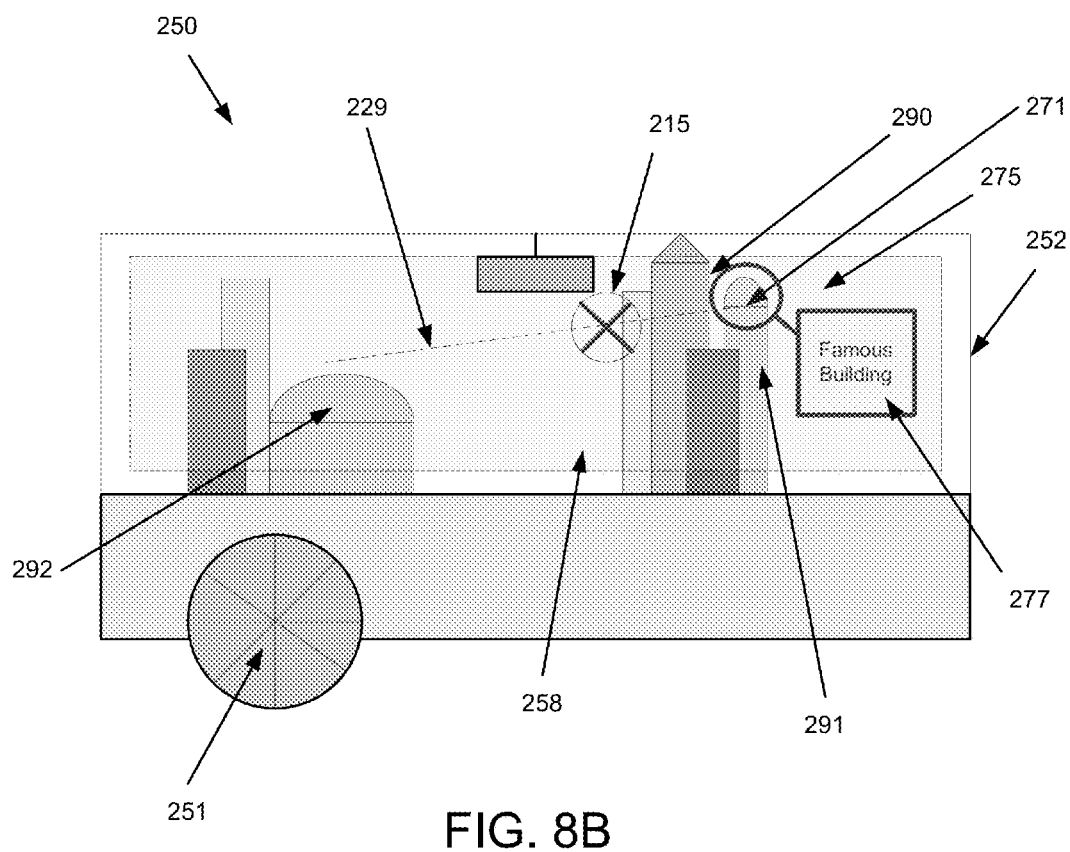
Figure 9A:
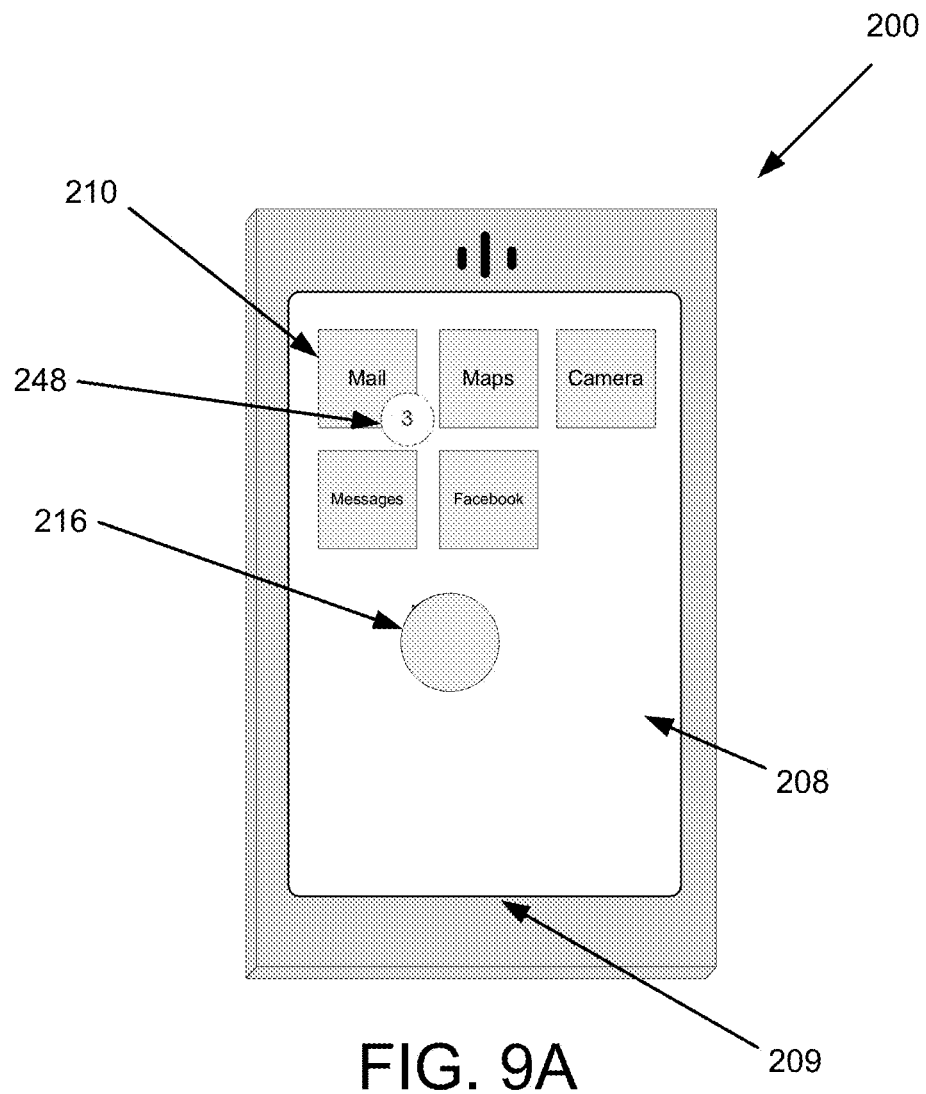
Figure 9B:
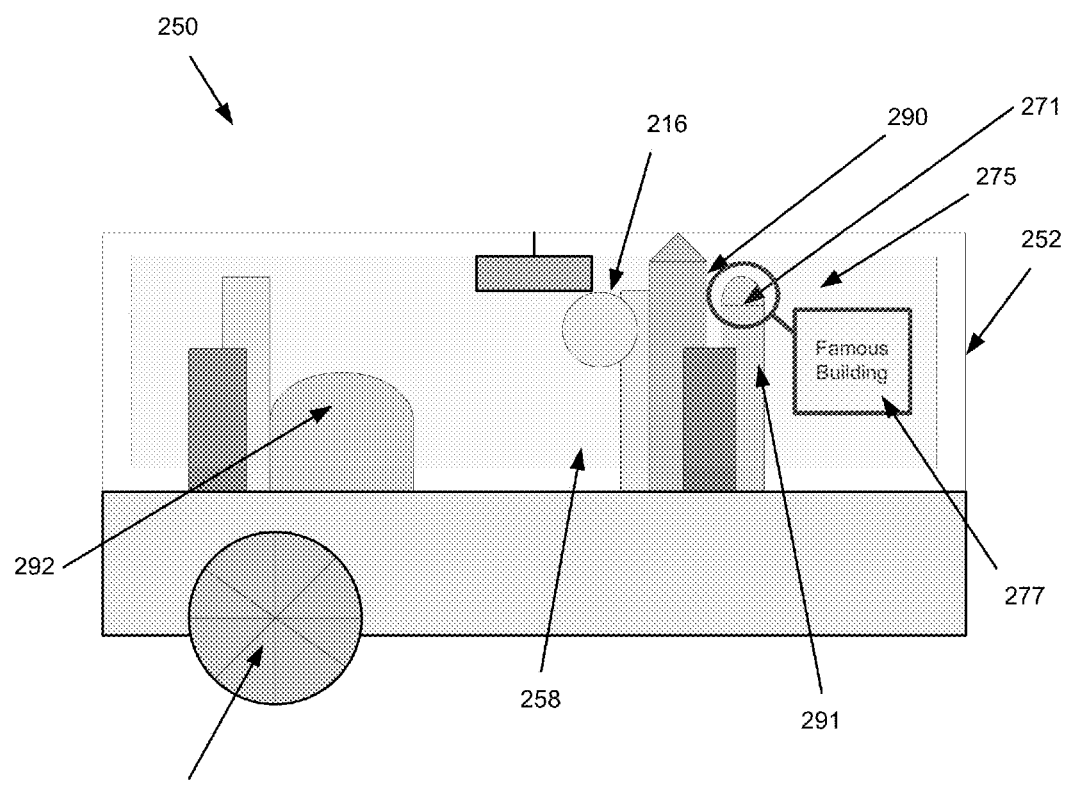
Figure 10A:
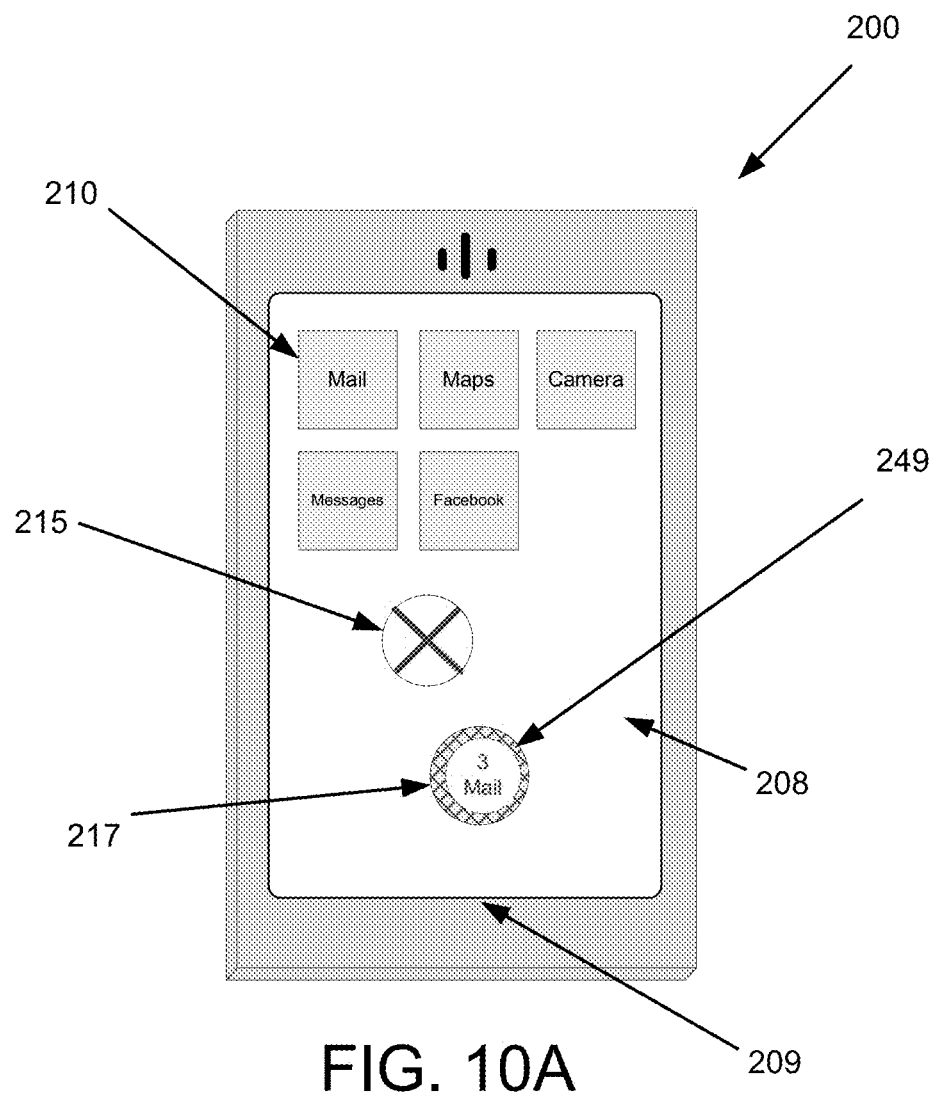
Figure 10B:
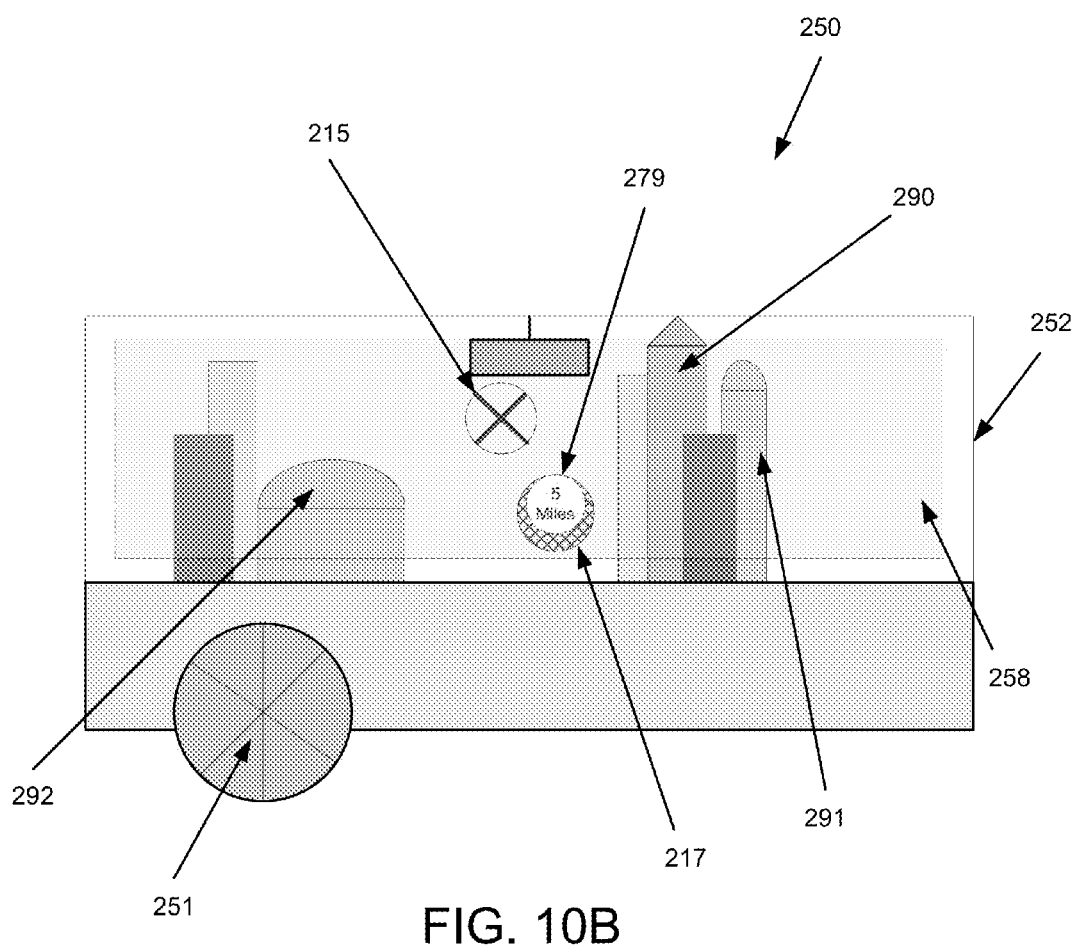
Figure 11A:
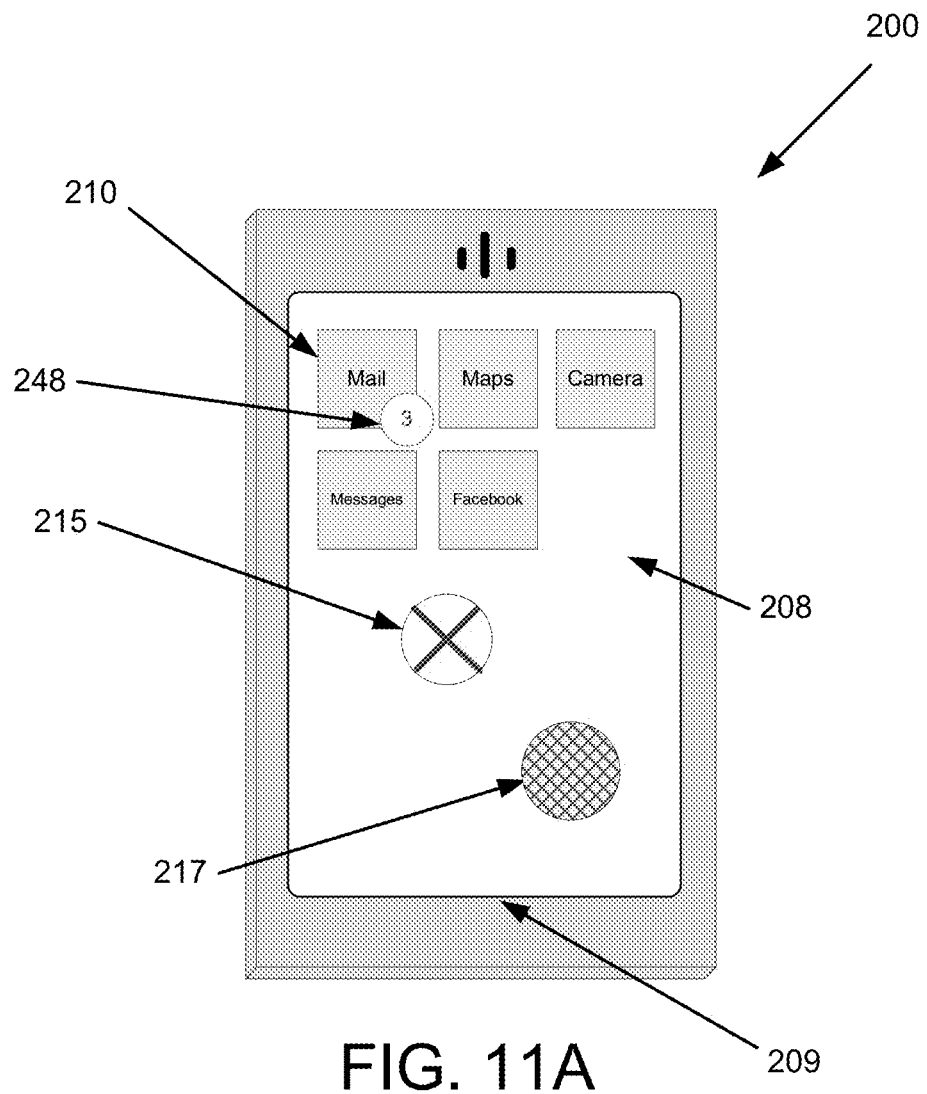
Figure 11B:
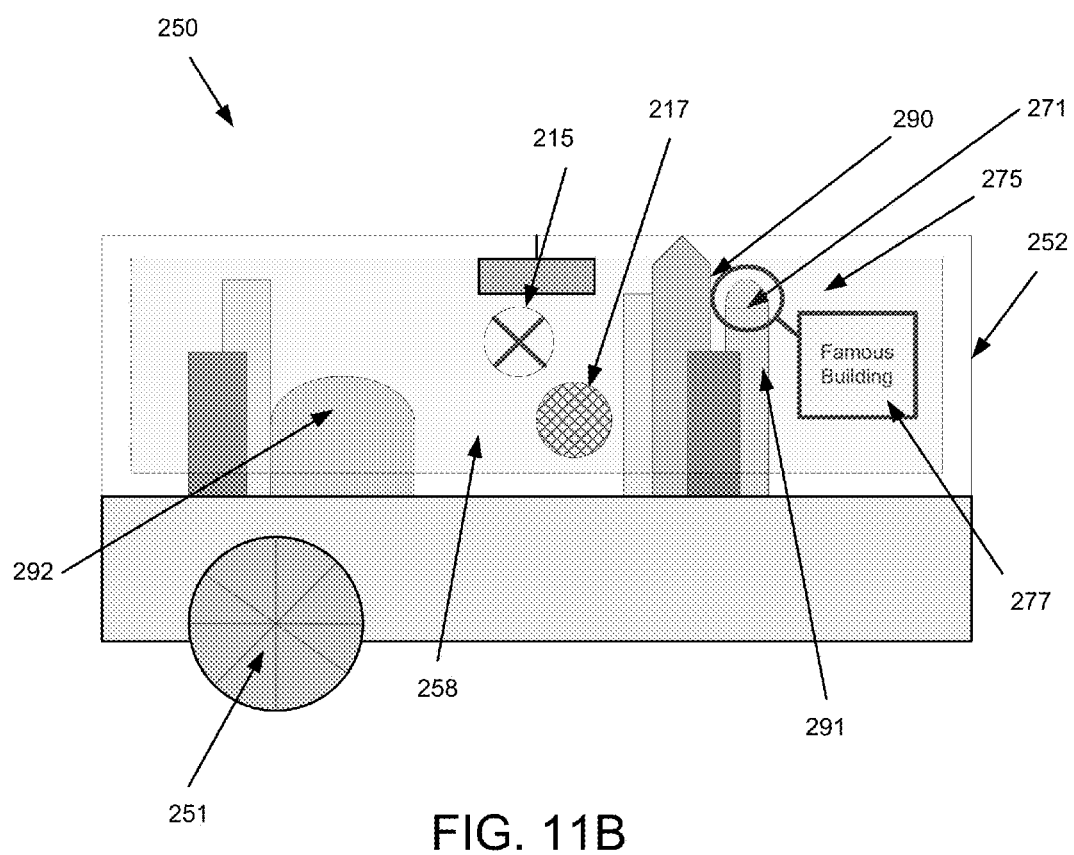
Figure 12:
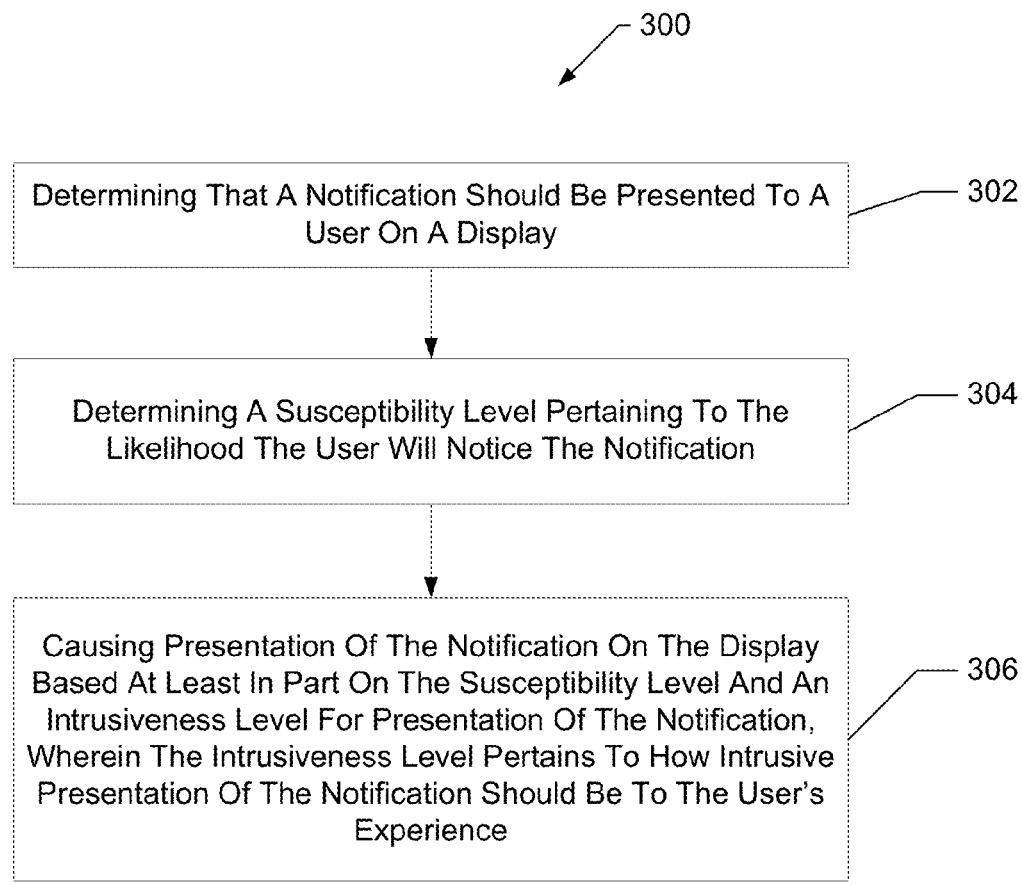
Figure 13:
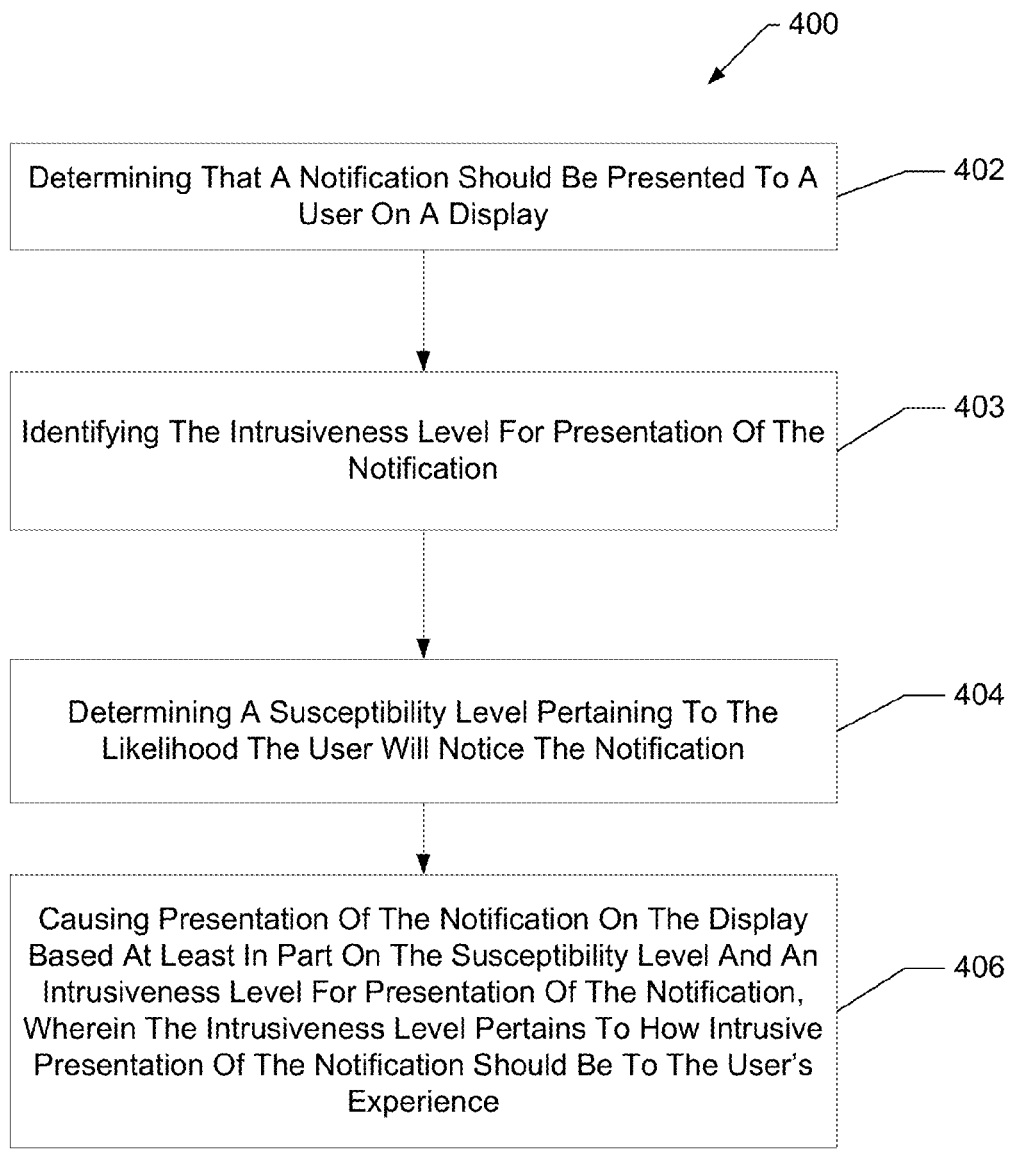

Having thus described embodiments of the invention in general terms, reference will now be made to the accompanying drawings, which are not necessarily drawn to scale, and wherein:

FIG. 1 illustrates a block diagram of an apparatus with a user interface according to an example embodiment;

FIG. 2 is a schematic block diagram of a mobile terminal according to an example embodiment;

FIG. 3A illustrates an example head-mounted display, wherein the display is pass-through such that a city skyline can be seen through the display, in accordance with an example embodiment of the present invention;

FIG. 3B illustrates an example windshield display for a car, wherein the display is pass-through such that a city skyline can be seen through the display, in accordance with an example embodiment of the present invention;

FIG. 4A illustrates an example device with a display, wherein the user's eyes are moving across the display, in accordance with an example embodiment described herein;

FIG. 4B illustrates an example car with a windshield with a pass-through display, wherein the user's eyes are moving across the display, in accordance with an example embodiment described herein;

FIG. 5A illustrates the device shown in FIG. 4A, wherein the user's eyes are blinking, in accordance with an example embodiment described herein;

FIG. 5B illustrates the windshield shown in FIG. 4B, wherein the user's eyes are blinking, in accordance with an example embodiment described herein;

FIG. 6A illustrates the device shown in FIG. 4A, wherein a portion of the display that corresponds to a blind spot of the user's eyes is highlighted, in accordance with an example embodiment described herein;

FIG. 6B illustrates the windshield shown in FIG. 4B, wherein a portion of the display that corresponds to a blind spot of the user's eyes is highlighted, in accordance with an example embodiment described herein;

FIG. 7A illustrates the device shown in FIG. 4A, wherein an example notification is presented on the display, in accordance with an example embodiment described herein;

FIG. 7B illustrates the device shown in FIG. 4A, wherein another example notification is presented on the display, in accordance with an example embodiment described herein;

FIG. 7C illustrates the windshield shown in FIG. 4B, wherein another example notification is presented on the display, in accordance with an example embodiment described herein;

FIG. 8A illustrates the device shown in FIG. 4A, wherein a notification is presented while the user's eyes are moving, in accordance with an example embodiment described herein;

FIG. 8B illustrates the windshield shown in FIG. 4B, wherein a notification is presented while the user's eyes are moving, in accordance with an example embodiment described herein;

FIG. 9A illustrates the device shown in FIG. 5A, wherein a notification is presented while the user's eyes are blinking, in accordance with an example embodiment described herein;

FIG. 9B illustrates the windshield shown in FIG. 5B, wherein a notification is presented while the user's eyes are blinking, in accordance with an example embodiment described herein;

FIG. 10A illustrates the device shown in FIG. 6A, wherein a notification is presented within the blind spot of the user's eyes, in accordance with an example embodiment described herein;

FIG. 10B illustrates the windshield shown in FIG. 6B, wherein a notification is presented within the blind spot of the user's eyes, in accordance with an example embodiment described herein;

FIG. 11A illustrates the device shown in FIG. 4A, wherein a notification is presented, in accordance with an example embodiment described herein;

FIG. 11B illustrates the windshield shown in FIG. 5B, wherein a notification is presented, in accordance with an example embodiment described herein;

FIG. 12 illustrates a flowchart according to an example method for causing presentation of a notification on a display based on the user's susceptibility to notice the notification and the desired intrusiveness of the presentation of the notification, in accordance with an example embodiment described herein; and FIG. 13 illustrates a flowchart according to another example method for causing presentation of a notification on a display based on the user's susceptibility to notice the notification and the desired intrusiveness of the presentation of the notification, in accordance with an example embodiment described herein.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to singular or plural data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of an apparatus 102 for causing presentation of a notification on a display based on the user's susceptibility to notice the notification and the desired intrusiveness of the presentation of the notification. It will be appreciated that the apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for facilitating interaction with a user interface, other configurations may also be used to implement embodiments of the present invention.

The apparatus 102 may be embodied as either a fixed device or a mobile device such as a desktop computer, laptop computer, mobile terminal, mobile computer, mobile phone, mobile communication device, game device, digital camera/ camcorder, audio/video player, television device, radio receiver, digital video recorder, positioning device, a chipset, a computing device comprising a chipset, any combination thereof, and/or the like. In this regard, the apparatus 102 may comprise any computing device that comprises or is in operative communication with a display. In some example embodiments, the apparatus 102 is embodied as a mobile computing device, such as the mobile terminal illustrated in FIG. 2.

In this regard, FIG. 2 illustrates a block diagram of a mobile terminal 10 representative of one example embodiment of an apparatus 102. It should be understood, however, that the mobile terminal 10 illustrated and hereinafter described is merely illustrative of one type of apparatus 102 that may implement and/or benefit from various example embodiments of the invention and, therefore, should not be taken to limit the scope of the disclosure. While several embodiments of the electronic device are illustrated and will be hereinafter described for purposes of example, other types of electronic devices, such as mobile telephones, mobile computers, personal digital assistants (PDAs), pagers, laptop computers, desktop computers, gaming devices, positioning devices, tablet computers, televisions, e-papers, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs (e.g., applications), which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a pass-through display, a projector, a holographic display or the like. The display 28 may, for example, comprise a three-dimensional touch display, examples of which will be described further herein below. The user input interface may comprise devices allowing the mobile terminal to receive data, such as a keypad 30, a touch display (e.g., some example embodiments wherein the display 28 is configured as a touch display), a joystick (not shown), and/or other input device. In embodiments including a keypad, the keypad may comprise numeric (0-9) and related keys (#, *), and/or other keys for operating the mobile terminal 10. Alternatively or additionally, the keypad 30 may include a conventional QWERTY keypad arrangement.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the apparatus 102 includes various means for performing the various functions herein described. These means may comprise one or more of a processor 110, memory 112, communication interface 114, user interface 116, sensor 118, or user interface (UI) control circuitry 122. The means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, and/or UI control circuitry 122 may be embodied as a chip or chip set. The apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20 (shown in FIG. 2). In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42 (shown in FIG. 2). The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, images, content, media content, user data, application data, and/or the like. This stored information may be stored and/or used by the UI control circuitry 122 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. In embodiments wherein the apparatus 102 is embodied as a mobile terminal 10, the communication interface 114 may be embodied as or comprise the transmitter 14 and receiver 16 (shown in FIG. 2). The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. As an example, the communication interface 114 may be configured to receive and/or otherwise access content (e.g., web page content, streaming media content, and/or the like) over a network from a server or other content source. The communication interface 114 may additionally be in communication with the memory 112, user interface 116, sensor 118, and/or UI control circuitry 122, such as via a bus.

The sensor 118 may be in communication with the processor 110, user interface 116, and/or UI control circuitry 122. In embodiments wherein the apparatus 102 is embodied as a mobile terminal 10, the sensor 118 may be embodied as or comprise the sensor 18 (shown in FIG. 2). In some embodiments, the sensor 118 may be configured to monitor a user's eyes, such as by tracking a user's gaze, monitoring whether the user's eyes are blinking, monitoring whether the user's eyes are moving, detecting the location and/or focus point of the user's eyes, etc. For example, the sensor 118 may be configured to transmit a beam or other signal (e.g., an infrared light) that bounces off the user's eyes (or eyelids). The sensor 118 may also be configured to receive the return beam or other signal. Additionally or alternatively, the sensor 118 may use other functionality (e.g., pictures and/or video taken with a camera) to monitor the user's eyes (or eyelids). Along these same lines, the sensor 118 may be configured to detect the size of a user's pupil in order to determine the user's focus point in a three-dimensional environment (e.g., depth of the user's focus point). Similarly, the sensor 118 may be configured to monitor other features of the user, such as the degree of movement of the user's gaze, movement of the user's eyelids, among others. In some embodiments, the sensor 118 may comprise a gaze tracker. Additionally or alternatively, in some embodiments the sensor 118 may include other types of sensors, such as proximity sensor, light sensor, gyroscope, camera, heart rate monitor, and/or accelerometer.

In some embodiments, the sensor 118 may provide output (e.g., signals, beams, pictures, videos, etc.) to the processor 110 to enable the processor 110 to determine certain circumstances regarding the user's gaze (e.g., location, focus point, etc.). This information may be used to determine any number of characteristics related to a user's eyes. For example, the information may be used to determine whether the user's eyes are moving and/or whether the user's eyes are blinking. Additionally, the information may be used to determine a position on a display (e.g., user interface 116) that corresponds to a blind spot of the user's eyes. Additional description regarding blind spots of the user's eyes will be presented herein. Moreover, in some embodiments, the information may be used to determine other characteristics, such as the field of vision of the user and, thus, what portion of the display, if any, is within the field of vision of the user.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. In embodiments wherein the apparatus 102 is embodied as a mobile terminal 10, the user interface 116 may be embodied as or comprise the display 28 and keypad 30 (shown in FIG. 2). The user interface 116 may be in communication with the memory 112, communication interface 114, sensor 118, and/or UI control circuitry 122, such as via a bus.

In some embodiments, the user interface 116 may comprise a pass-through display. Likewise, in embodiments wherein the apparatus 102 is embodied as a mobile terminal 10, the display 28 may be embodied as a pass-through display. In some embodiments, a pass-through display may be configured to present images (e.g., text, icons, pictures, videos, visual attractants, etc.) in an at least partially transparent form (e.g., image overlay) such that a user may be able to see through the images being presented. Though some example embodiments are described herein with respect to a pass-through display, other user interfaces are contemplated (e.g., presentation screen, projection display, among others).

As such, some example embodiments may provide for an apparatus (e.g., apparatus 102) for providing input through a device comprising a display, such as the glasses 150 shown in FIG. 3A or the car 170 with windshield 175 shown in FIG. 3B. The apparatus with a pass-through display may provide a visual overlay of images on a substantially transparent display surface, such as through lenses that appear to be normal optical glass lenses. This visual overlay allows a user to view objects and people in their typical, un-obscured field of view while providing additional images that may be displayed on the pass-through display. The visual overlay of the images may be of various opacity ranging from transparent (or 0% opacity) to opaque (or 100% opacity). For example, the images presented on the pass-through display may, in some cases, fully occlude the user's vision beyond the display by being presented in a substantially opaque manner on a substantially transparent display. In some embodiments, the presented images may be partially transparent such that the wearer is able to see the environment beyond the pass-through display. The degree of transparency may be variable from fully transparent, where the image is not shown, to fully opaque or non-transparent, or any degree therebetween. Additionally, in some embodiments, the degree of transparency may vary across the entire display.

Example embodiments may also present information that is arranged at the edges of the pass-through display or that include a central area of the display which is substantially transparent while presenting a less transparent and possibly opaque image around the substantially transparent area. Such an embodiment may allow a user to view their environment while also providing images for the user to view.

Apparatuses with pass-through displays allow for the presentation of two-dimensional (2-D) and three-dimensional (3-D) visual elements. Two-dimensional graphical elements rendered in the plane of the display can present the user with a user interface, status elements, or other images as would be viewed on a typical computer screen or display of a mobile terminal (e.g., display 28 of mobile terminal 10). These 2-D elements can communicate messages, alert the user with a notification, render an application that is currently in use, etc. Further 2-D elements may provide images regarding an object that a user of the pass-through display is viewing through the display, such as by identifying a point-of-interest or landmark that a user is viewing. Such identification may be accomplished by various means including object recognition software or object recognition in conjunction with location identification (e.g., via Global Positioning System (GPS) signals) of the apparatus (e.g., apparatus 102) or the device to which they are in communication, such as mobile terminal 10. Three-dimensional elements can be rendered on top of the environment and seen through the pass-through display to identify objects, provide navigation, etc.

Some examples of apparatuses (e.g., apparatus 102) with a pass-through display are illustrated in FIGS. 3A and 3B. FIG. 3A illustrates an example head-mounted display (e.g., glasses 150) that includes a left lens 154 and a right lens 152. The left lens 154 and right lens 152 may be configured to interact with a user's left and right eye respectively. Additionally, the glasses 150 may include a frame 151 that is configured to engage with a user's head (e.g., ears) to mount to the user's head.

In some embodiments, the glasses 150 may comprise (or be in communication with) a processor (e.g., processor 110) that is configured to control presentation of images. For example, in the depicted embodiment of the glasses 150, the processor may be configured to control presentation of images on a left lens display 164 and a right lens display 162. In some embodiments, the images presented on the left lens display 164 and right lens display 162 may be independent and/or they may be complementary.

As illustrated in FIG. 3A, a user (not shown) may look through the left lens 154 and right lens 152 and the corresponding left lens display 164 and right lens displays 162, respectively, to see information, such as a city skyline 190. Additionally, in some embodiments, the glasses 150 may be configured to cause presentation of images on the left lens display 162 and/or right lens display 164. In the depicted embodiment, the description "CITY SKYLINE" 180 is being presented to the user on the left lens display 164 and right lens displays 162 to indicate that the user is looking at the skyline of the city (e.g., through the left lens 154 and right lens 152). Though words are shown as being presented on the display, embodiments of the present invention contemplate presenting other types of images on the display (e.g., pictures, videos, notifications, visual attractants. etc.). Additionally, though the words shown in FIG. 3A are not transparent, embodiments of the present invention contemplate presentation of at least partially transparent images on the display.

FIG. 3B illustrates an example car 170 with a windshield with a pass-through display. In the depicted embodiment, the car 170 includes a dashboard 172, steering wheel 171, rearview mirror 173 and windshield 175. The windshield 175 includes a display 176. In some embodiments, an apparatus associated with the car 170 may comprise (or be in communication with) a processor (e.g., processor 110) that is configured to control presentation of images. For example, in the depicted embodiment of the car 170, the processor may be configured to control presentation of images on the display 176 of the windshield 175.

As illustrated in FIG. 3B, a user (not shown) may look through the windshield 175 and the display 176 to see information, such as a city skyline 190. Additionally, in some embodiments, the car 170 may be configured to cause presentation of images on the display 176. In the depicted embodiment, the description "CITY SKYLINE" 180 is being presented to the user on the display 176 to indicate that the user is looking at the skyline of the city (e.g., through the windshield 175). Though words are shown as being presented on the display, embodiments of the present invention contemplate presenting other types of images on the display (e.g., pictures, videos, notifications, visual attractants, etc.). Additionally, though the words shown in FIG. 3A are not transparent, embodiments of the present invention contemplate presentation of at least partially transparent images on the display.

It should also be noted that while FIGS. 3A and 3B each illustrate one example of an apparatus with a pass-through display, numerous other apparatuses configured with a pass-through display are contemplated for embodiments of the present invention (e.g., a helmet visor, a cockpit windshield, etc.). Moreover, embodiments of the present invention are not meant to be limited to apparatuses with pass-through displays, and may be useful with other example apparatuses, such as any apparatus 102 (e.g., mobile terminal 10) described herein (e.g., a mobile computing device, a fixed computing device, etc.).

Returning to FIG. 1, the UI control circuitry 122 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In some example embodiments wherein the UI control circuitry 122 is embodied separately from the processor 110, the UI control circuitry 122 may be in communication with the processor 110. The UI control circuitry 122 may further be in communication with one or more of the memory 112, communication interface 114, sensor 118, and/or user interface 116, such as via a bus.

The UI control circuitry 122 may be configured to receive user input from a user interface 116, such as a touch display. The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the UI control circuitry 122 may determine a position of the user input such as for determining a portion of the display to which the user input correlates.

The touch display may also be configured to enable the detection of a hovering gesture input. A hovering gesture input may comprise a gesture input to the touch display without making physical contact with a surface of the touch display, such as a gesture made in a space some distance above/in front of the surface of the touch display. As an example, the touch display may comprise a projected capacitive touch display, which may be configured to enable detection of capacitance of a finger or other input object by which a gesture may be made without physically contacting a display surface. As another example, the touch display may be configured to enable detection of a hovering gesture input through use of acoustic wave touch sensor technology, electromagnetic touch sensing technology, near field imaging technology, optical sensing technology, infrared proximity sensing technology, some combination thereof, or the like.

The apparatus 102, such as through the sensor 118, which, as noted above, may comprise a gaze tracker, may be configured to monitor the user's eyes. In some embodiments, the apparatus 102, such as through the processor 110, may be configured to determine circumstances related to the user's eyes. For example, in some embodiments, the apparatus 102, such as through the processor 110, may be configured to determine whether the user's eyes are moving.

FIG. 4A illustrates an example device 200 (e.g., apparatus 102) with a display 208. Icons, such as the "Mail" icon 210, are presented on the display 208. The device 200, such as through its various components (e.g., sensor 118, user interface 116, etc.), may determine that the user's eyes (as represented by the focus point of the user's gaze) 215 are moving across the display 208 (e.g., along line 219), such as from one position on the display (e.g., the "Mail" icon 210) toward a second position on the display (e.g., the bottom portion 209 of the display 208).

FIG. 4B illustrates an example car 250 (e.g., apparatus 102) with a windshield 252 with a pass-through display 258. The car 250 may include a steering wheel 251. A city skyline 290 may be seen through the windshield 252 and the display 258. For example, a famous building 291 (e.g., information) in the city skyline 290 may be seen through the display 258. The apparatus associated with car 250, such as through its various components (e.g., sensor 118, user interface 116, etc.), may determine that the user's eyes (as represented by the focus point of the user's gaze) 215 are moving across the display 208 (e.g., along line 229), such as from one position on the display (e.g., above the stadium 292) toward a second position on the display (e.g., the portion 271 of the display 258 associated with the famous building 291).

In some embodiments, the apparatus 102, such as through the processor 110, may be configured to determine whether the user's eyes are blinking. As noted above, the various components may monitor the user's eyes and/or eyelids to determine that the user is blinking. For example, with reference to FIG. 5A, the device 200, such as through its various components (e.g., sensor 118, user interface 116, etc.), may determine that the user's eyes are blinking (as represented by the closed circle 216). Another example embodiment is represented with respect to FIG. 5B. In FIG. 5B, the apparatus associated with the car 250, such as through its various components (e.g., sensor 118, user interface 116, etc.), may determine that the user's eyes are blinking (as represented by the closed circle 216).

In some embodiments, the apparatus 102, such as through the processor 110, may be configured to determine a position on the display that corresponds to a blind spot of the user's eyes. Based on the make-up of the nerves inside a human eye, there is a blind spot that forms in the field of vision of the eye. In some cases, the human brain often fills in the blind spot, such as by guessing the environment (e.g., interpolating from adjacent environment, remembering from previous experience, etc.). As noted above, the various components may monitor the user's eyes, such as the current focus point of the eyes, to determine a position on the display that corresponds to a blind spot of the user's eyes. In some embodiments, the user may undergo a calibration with the apparatus 102 to determine the blind spot of the user's eyes. Additionally or alternatively, the location of the blind spot may be user configurable.

For example, with reference to FIG. 6A, the device 200, such as through its various components (e.g., sensor 118, user interface 116, etc.), may determine a position on the display 208 that corresponds to a blind spot of the user's eyes (as represented by the patterned circle 217). Another example embodiment is represented with respect to FIG. 6B. In FIG. 6B, the apparatus associated with the car 250, such as through its various components (e.g., sensor 118, user interface 116, etc.), may determine a position on the display 258 that corresponds to a blind spot of the user's eyes (as represented by the patterned circle 217).

It is noted that some embodiments of the present invention may not be limited to the above descriptions of possible determinations by the apparatus 102 related to the user's eyes. Indeed, as noted above, many characteristics or situations related to the user's eyes may be determined. For example, the apparatus 102, such as through the processor 102, may be configured to determine a position on the display that is outside the user's field of vision. In such a regard, based on the current focus point of the user's eyes the apparatus 102 may be configured to determine the user's field of vision.

The apparatus 102, such as through the processor 110, sensor 118, user interface 116, and/or UI control circuitry 122, may be configured to determine a susceptibility level pertaining to the likelihood a user will notice a notification. In some embodiments, the apparatus 102, such as through its various components (e.g., sensor 118, user interface 116, and/or UI control circuitry 122), may monitor the user, including the user's eyes (or eyelids), to help determine the user's susceptibility level.

A user, based on circumstances surrounding the user, may, in some cases, be less susceptible to noticing a notification. In some embodiments, the apparatus 102 may determine that a user has a low susceptibility level such that there is a low likelihood that the user will notice the notification. In such embodiments, the apparatus 102 may be configured to determine that the user has a low susceptibility level by determining at least one of: that the user's eyes are moving; that the user's eyes are blinking; and that the user's eyes have a blind spot that corresponds to at least one position on the display. In some embodiments, the apparatus 102 may be configured to determine that the user has a low susceptibility level by determining other possible situations, such as that the user's field of vision does not completely cover the display. Such situations may indicate that the user will have a low likelihood of noticing a notification (e.g., a low susceptibility level). For example, in some cases, the situation where a user's eyes are moving may be referred to as a saccade. In particular, a saccade may occur when a user's focus point transfers from one position to another position without focusing on any information therebetween. During a saccade the human eye may not actually process images and, thus, the user may be temporarily blind. Similarly, a user is temporarily blind while the user's eyes are blinking. As such, a user has a low likelihood of noticing a notification during these situations. Along similar lines, as noted above, a user's eyes contain blind spots that may correspond to a position of the display. As such, a user has a low likelihood of noticing a notification that is presented in the position that corresponds to the blind spot of the user's eyes.

On the other hand, in some cases, the user may be more susceptible to noticing a notification. In some embodiments, the apparatus 102 may determine that a user has a high susceptibility level such that there is a high likelihood that the user will notice the notification. In such embodiments, the apparatus 102 may be configured to determine that the user has a high susceptibility level by determining at least one of: that the user's eyes are not moving; that the user's eyes are not blinking; and that the user's eyes have a blind spot that does not correspond to at least one position on the display. In some embodiments, the apparatus 102 may be configured to determine that the user has a high susceptibility level by determining other possible situations, such as that the user's field of vision completely covers the display. Such situations may indicate that the user will have a high likelihood of noticing a notification (e.g., a high susceptibility level). For example, in some cases, the situation where a user's eyes are not moving or not blinking may indicate that the user will quickly and easily notice the notification and, thus, the user has a high (or higher) likelihood of noticing a notification during these situations. Along similar lines, as noted above, a user's eyes contain blind spots that may correspond to a position of the display. As such, a user has a high (or higher) likelihood of noticing a notification that is presented in a position that does not correspond to the user's eyes blind spot.

Though the above examples indicate a degree of susceptibility as high or low (such as with respect to each other), other indicators may be used (e.g., numbers, letters, etc.) to denote a susceptibility level of a user.

The apparatus 102, such as through the processor 110, user interface 116, and/or UI control circuitry 122, may be configured to determine that a notification should be presented to the user. As noted herein, the apparatus 102 may be configured to perform operations (e.g., execute applications, facilitate cellular communication, etc.). In some embodiments, depending on the operation, the apparatus 102 may be configured to notify the user of certain information, such as information related to the operation. For example, with reference to FIG. 7A, a device 200 may receive an indication that phone call is incoming. The device 200 may determine that a notification 240 indicating to the user that a phone call is incoming should be presented to the user. Thus, in the depicted embodiment, the notification 240 is presented on the display 208 with the message "RECEIVE INCOMING CALL" 225.

FIG. 7B illustrates another example embodiment in which the device 200 may receive an indication that the user has received an email message. The device 200 may determine that a notification 248 indicating that the user has received an email message should be presented to the user. Thus, in the depicted embodiment, the device 200 may be configured to present a number in a bubble (e.g., notification 248) over a portion of the "Mail" icon 210.

An example embodiment with a pass-through display is illustrated in FIG. 7C. In the depicted embodiment, an apparatus associated with a car 250 with a windshield 252 and pass-through display 258 may determine that a famous building 291 of a city skyline 290 is viewable through the display 258. The apparatus associated with the car 250 may determine that a notification 275 should be presented to the user. Thus, in the depicted embodiment, the notification 275 highlighting the famous building 291 and including the message "Famous Building" 277 is presented on the windshield display 258 overlaying the famous building 291 (e.g., in the user's line of sight to the famous building 291). As noted above, in some embodiments, the apparatus associated with the car 250) may be configured to determine that the information (e.g., famous building 291) is associated with portion of the display 258. This may be particularly important for pass-through displays, in which the information may be beyond the actual display, such as in the example of the famous building 291 that is likely miles down the road, yet still visible through the display 258. Despite this, in the depicted embodiment, the apparatus associated with the car 250 may still determine a portion of the display 258 that can be associated with the famous building 291. For example, the apparatus associated with the car 250 may determine that the famous building may be seen through a portion of the display from the perspective of the user (e.g., in the line of sight of the user), which in the case of the car may be the driver and/or any passenger. In particular, the apparatus associated with the car 250 may determine that portion 271 of the display 258 (e.g., to the right of the rear-view mirror 273) is associated with the famous building 291. Thus, the apparatus associated with the car 250 may cause presentation of the notification 275 proximate the portion 271 of the display 258 associated with the famous building 291.

Though the above depicted example embodiments describe information that may be associated with an operation performed by the apparatus 102, any type of information is contemplated for embodiments of the present invention.

Embodiments of the present invention are not meant to be limited to the above example notifications presented in FIGS. 7A, 7B, and 7C, as other notifications are contemplated. Additionally, though the above notifications are presented in black and white, different colors may be used to aid in presenting the notification. Additional features (e.g., flashing, blinking, movement, animations, changing colors, etc.) of presenting the notification are also contemplated by some embodiments of the present invention.

As noted above, some events or operations may be more urgent, desirable, or important than others. As such, in some cases, it may be desirable to cause presentation of the corresponding notifications to be more intrusive such that the user's experience is interrupted. In other situations, the event or operation may be less urgent, desirable, or important such that, in some cases, it may be desirable to cause presentation of the corresponding notifications to be less intrusive such that the user's experience is not interrupted (or interrupted to less of a degree). As such, in some embodiments, presentation of the notification may be based on an intrusiveness level that pertains to how intrusive presentation of the notification should be to the user's experience.

In some embodiments, the apparatus 102, such as through the processor 110, sensor 118, user interface 116, and/or UI control circuitry 122, may be configured to identify the intrusiveness level for presentation of the notification. In some embodiments, the apparatus 102, such as through its various components (e.g., sensor 118, user interface 116, and/or UI control circuitry 122), may be configured to determine the intrusiveness level for a specific event or operation (or corresponding presentation of the notification) to help identify the intrusiveness level. Additionally, or alternatively, the apparatus 102, such as through the processor 110, may be configured to look up a pre-determined intrusiveness level for a specific event or operation (or corresponding presentation of the notification) to help identify the intrusiveness level. As such, in some embodiments, the intrusiveness level may vary and may be configurable by the user or determinable by the apparatus 102, such as through the processor 110, based on certain criteria (e.g., urgency of the event, identity of the sender, etc.).

As used herein, some example embodiments may compare the identified intrusiveness level to a pre-determined intrusiveness level threshold. Alternatively, in some embodiments, the intrusiveness level threshold may be determined by the apparatus 102 (such as by the processor) and may vary and/or may be configurable by the user. Additionally, the intrusiveness level, as used herein, may indicate a degree of how intrusive presentation of the notification should be to the user's experience, such as any indication of degree (e.g., high/low, numbers, letters, etc.).

While a notification may be helpful in notifying a user of important or new information, the notification may be quite distracting for a user. Moreover, due to the increased functionality of devices such as apparatus 102, a user may often be presented with a large number of notifications throughout the day. However, depending on the timing for the user (e.g., the user is currently performing an important task, talking to another person, etc.), even one notification may be invasive or overly disruptive. Conversely, the event that the notification is related to may be extremely important or urgent (among other situations) such that it may be desirable to notify the user in an intrusive manner. As such, some embodiments of the present invention seek to present the notification in a manner consistent with the intrusiveness level of the presentation of the notification and the susceptibility level of the user. In such a manner, some embodiments provide for a dynamic system for presentation of notifications that is situation specific, both in terms of the notification and the user.

As such, in some embodiments, the apparatus 102, such as through the processor 110, user interface 116, and/or UI control circuitry 122, may be configured to cause presentation of the notification on the display based at least in part on the susceptibility level and an intrusiveness level for presentation of the notification.

In some embodiments, the apparatus 102 may be configured to cause presentation of the notification on the display while the user has a low susceptibility level in an instance in which the intrusiveness level of the notification is below a pre-determined intrusiveness level threshold. In such a circumstance, it may be desirable for the presentation of the notification to be less intrusive to the user's experience. As such, the presentation of the notification may be designed to occur when the user has a low likelihood of noticing the notification. Example embodiments of such situations can be seen with respect to FIGS. 8A, 8B, 9A, 9B, 10A, and 10B.

In some embodiments, the apparatus 102 (e.g., through the processor 110, user interface 116, UI control circuitry 122, etc.) may be configured to cause presentation of the notification at a time concurrent with the user having a low susceptibility level, such as while the user's eyes are moving. For example, with reference to FIG. 8A, the device 200 may cause presentation of the notification 248 (e.g., a number in a bubble over a portion of the "Mail" icon 210) while the user's eyes are moving. In the depicted embodiment, the user's eyes (as represented by the focus point of the user's gaze) 215 are moving across the display 208 (e.g., along line 219). Similarly, with reference to FIG. 8B, the apparatus associated with the car 250 may cause presentation of the notification 275 (e.g., highlighting the famous building 291 and including the message "Famous Building" 277 overlaying the famous building 291) while the user's eyes are moving. In the depicted embodiment, the user's eyes (as represented by the focus point of the user's gaze) 215 are moving across the display 208 (e.g., along line 229). In such situations, the notifications 248, 275 respectively are each being presented during the saccade of the user, thereby decreasing the intrusiveness of the presentation of the notification based on the low susceptibility of the user.

Additionally, in some embodiments, the apparatus 102 (e.g., through the processor 110, user interface 116, UI control circuitry 122, etc.) may be configured to cause presentation of the notification at a time concurrent with the user having a low susceptibility level, such as while the user's eyes are blinking. For example, with reference to FIG. 9A, the device 200 may cause presentation of the notification 248 (e.g., a number in a bubble over a portion of the "Mail" icon 210) while the user's eyes are blinking (as represented by the closed circle 216). Similarly, with reference to FIG. 9B, the apparatus associated with the car 250 may cause presentation of the notification 275 (e.g., highlighting the famous building 291 and including the message "Famous Building" 277 overlaying the famous building 291) while the user's eyes are blinking (as represented by the closed circle 216). In such situations, the notifications 248, 275 respectively are each being presented while the user's eyes are closed, thereby decreasing the intrusiveness of the presentation of the notification based on the low susceptibility of the user.

In some embodiments, the apparatus 102 (e.g., through the processor 110, user interface 116, UI control circuitry 122, etc.) may be configured to cause presentation of the notification at a specific position on the display that corresponds to while the user has a low susceptibility level, such as at the position on the display that corresponds to a blind spot of the user's eyes. For example, with reference to FIG. 10A, the device 200 may cause presentation of a notification 249 (e.g., a number and the message "Mail" in a bubble) in a position that corresponds to the blind spot of the user's eyes (as represented by the pattern circle 217). Similarly, with reference to FIG. 10B, the apparatus associated with the car 250 may cause presentation of a notification 279 (e.g., a number and the message "Miles" in a bubble, such as may correspond to the distance to travel to reach a destination) in a position that corresponds to the blind spot of the user's eyes (as represented by the pattern circle 217). In such situations, the notifications 249, 279 respectively are each being presented within the user's eyes blind spot, thereby decreasing the intrusiveness of the presentation of the notification based on the low susceptibility of the user.

Along similar lines, in some embodiments, the apparatus 102 (e.g., through the processor 110, user interface 116, UI control circuitry 122, etc.) may be configured to cause presentation of the notification at a specific position on the display that is outside the user's field of vision. In such a regard, the presentation of the notification may not be interruptive of the user's current task, since it is outside the user's field of vision.

In some embodiments, the apparatus 102 may be configured to cause presentation of the notification on the display while the user has a high susceptibility level in an instance in which the intrusiveness level of the notification is above a pre-determined intrusiveness level threshold. In such a circumstance, it may be desirable for the presentation of the notification to be more intrusive to the user's experience. As such, the presentation of the notification may be designed to occur when the user has a high likelihood of noticing the notification.

For example, in some embodiments, the apparatus 102 (e.g., through the processor 110, user interface 116, UI control circuitry 122, etc.) may be configured to cause presentation of the notification while the user's eyes are not moving in an instance in which the intrusiveness level of the notification is above a pre-determined intrusiveness level threshold. Additionally or alternatively, in some embodiments, the apparatus 102 (e.g., through the processor 110, user interface 116, UT control circuitry 122, etc.) may be configured to cause presentation of the notification while the user's eyes are not blinking in an instance in which the intrusiveness level of the notification is above a pre-determined intrusiveness level threshold. For example, with reference to FIG. 11A, the device 200 may cause presentation of the notification 248 (e.g., a number in a bubble over a portion of the "Mail" icon 210) while the user's eyes are not moving or blinking (as represented by location of the user's eyes 215 not moving along a line or closed due to blinking). Similarly, with reference to FIG. 11B, the apparatus associated with the car 250 may cause presentation of the notification 275 (e.g., highlighting the famous building 291 and including the message "Famous Building" 277 overlaying the famous building 291) while the user's eyes are not moving or blinking (as represented by location of the user's eyes 215 not moving along a line or closed due to blinking). In such situations, the notifications 248, 275 respectively are each being presented while the user has a high susceptibility level, thereby increasing the intrusiveness of the presentation of the notification based on the high susceptibility of the user.

In some embodiments, the apparatus 102 (e.g., through the processor 110, user interface 116, UI control circuitry 122, etc.) may be configured to cause presentation of the notification in a position on the display that does not correspond to the blind spot of the user's eyes in an instance in which the intrusiveness level of the notification is above a pre-determined intrusiveness level threshold. For example, with reference to FIG. 11A, the device 200 may cause presentation of the notification 248 (e.g., a number in a bubble over a portion of the "Mail" icon 210) in a position that does not correspond to the blind spot of the user's eyes (as represented by the pattern circle 217). Similarly, with reference to FIG. 11B, the apparatus associated with the car 250 may cause presentation of the notification 275 (e.g., highlighting the famous building 291 and including the message "Famous Building" 277 overlaying the famous building 291) in a position that does not correspond to the blind spot of the user's eyes (as represented by the pattern circle 217). In such situations, the notifications 248, 275 respectively are each being presented outside of the user's eyes blind spot, thereby increasing the intrusiveness of the presentation of the notification based on the high susceptibility of the user.

Along similar lines, in some embodiments, the apparatus 102 (e.g., through the processor 110, user interface 116, UI control circuitry 122, etc.) may be configured to cause presentation of the notification at a specific position on the display that is within the user's field of vision. In such a regard, the presentation of the notification may be interruptive of the user's current task, since it is within the user's field of vision.

In some embodiments, the apparatus 102 (such as through the processor 110, user interface 116, UI control circuitry 122, etc.) may be configured to cause introduction of presentation of a notification based on the susceptibility level and/or intrusiveness level. Furthermore, in some embodiments, the apparatus 102 may be configured to cease introduction of presentation of a notification based on the susceptibility level and/or intrusiveness level. For example, in some embodiments, the apparatus 102 may be configured to cease introduction of presentation when the user susceptibility level changes. In such situations, the introduction of the presentation of the notification may include the initial presentation of the notification, which may cause an abrupt change in the overall presentation of the display. For example, an abrupt introduction of a notification may cause a user to be interrupted, such as to quickly glance or otherwise look at the newly introduced notification.

As such, in some embodiments, the apparatus 102 may be configured to cause introduction of presentation of the notification to start and finish based on (such as during) the user susceptibility level. For example, as noted above with respect to some example embodiments, the apparatus 102 may be configured to cause presentation of a notification while a user has a low susceptibility level. In such an embodiment, it may be beneficial to cause introduction of presentation of the notification while the user has a low susceptibility level. Additionally, however, it may be beneficial to cease introduction of presentation of the notification while the user has a low susceptibility level, such as before the user susceptibility level changes. For example, the instant presentation of the notification may occur while the user's eyes are moving (e.g., during a saccade). In such a situation, the user may not notice the abrupt introduction and may only come across the notification once they decide to focus on that portion of the display. On the other hand, in some embodiments, the apparatus 102 may be configured cause introduction of the presentation of the notification while the user has a high susceptibility level, such as in the case where it is desirable for the user to be interrupted.

Embodiments of the present invention provide methods, apparatus and computer program products for causing presentation of a notification on a display based on the user's susceptibility to notice the notification and the desired intrusiveness of the presentation of the notification. Various examples of the operations performed in accordance with embodiments of the present invention will now be provided with reference to FIGS. 12-13.

FIG. 12 illustrates a flowchart according to an example method for causing presentation of a notification on a display based on the user's susceptibility to notice the notification and the desired intrusiveness of the presentation of the notification according to an example embodiment 300. The operations illustrated in and described with respect to FIG. 12 may, for example, be performed by, with the assistance of, and/or under the control of one or more of the processor 110, memory 112, communication interface 114, user interface 116, sensor 118, or UI control circuitry 122. Operation 302 may comprise determining that a notification should be presented to a user on a display. The processor 110, communication interface 114, user interface 116, sensor 118, and/or UI control circuitry 122 may, for example, provide means for performing operation 302. Operation 304 may comprise determining a susceptibility level pertaining to the likelihood the user will notice the notification. The processor 110, sensor 118, user interface 116, and/or UI control circuitry 122 may, for example, provide means for performing operation 304. Operation 306 may comprise causing presentation of the notification on the display based at least in part on the susceptibility level and an intrusiveness level for presentation of the notification, wherein the intrusiveness level pertains to how intrusive presentation of the notification should be to the user's experience. The processor 110, communication interface 114, user interface 116, sensor 118, and/or UI control circuitry 122 may, for example, provide means for performing operation 306.

FIG. 13 illustrates a flowchart according to another example method for causing presentation of a notification on a display based on the user's susceptibility to notice the notification and the desired intrusiveness of the presentation of the notification according to an example embodiment 400. The operations illustrated in and described with respect to FIG. 13 may, for example, be performed by, with the assistance of, and/or under the control of one or more of the processor 110, memory 112, communication interface 114, user interface 116, sensor 118, or UI control circuitry 122. Operation 402 may comprise determining that a notification should be presented to a user on a display. The processor 110, communication interface 114, user interface 116, sensor 118, and/or UI control circuitry 122 may, for example, provide means for performing operation 402. Operation 403 may comprise identifying the intrusiveness level for presentation of the notification. The processor 110, sensor 118, user interface 116, and/or UI control circuitry 122 may, for example, provide means for performing operation 403.

Operation 404 may comprise determining a susceptibility level pertaining to the likelihood the user will notice the notification. The processor 110, sensor 118, user interface 116, and/or UI control circuitry 122 may, for example, provide means for performing operation 404. Operation 406 may comprise causing presentation of the notification on the display based at least in part on the susceptibility level and an intrusiveness level for presentation of the notification, wherein the intrusiveness level pertains to how intrusive presentation of the notification should be to the user's experience. The processor 110, communication interface 114, user interface 116, sensor 118, and/or UI control circuitry 122 may, for example, provide means for performing operation 406.

FIGS. 12-13 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
    determining, by a processor, that a notification should be presented to a user on a display;
    determining an intrusiveness level for presentation of the notification, wherein the intrusiveness level pertains to how intrusive presentation of the notification should be to the user's experience;
    determining a focal point of the user;
    determining a susceptibility level pertaining to the likelihood the user will notice the notification by determining that the user has a low susceptibility level such that there is a low likelihood that the user will notice the notification;
    determining at least one of: an instance in which a saccade of the user occurs, an instance in which the user's eyes are blinking, or a blind spot of the user;
    causing initial presentation of the notification on the display based at least in part on the susceptibility level, the focal point of the user, and the intrusiveness level for presentation of the notification, wherein causing initial presentation of the notification comprises causing initial presentation of the notification on the display while the user has the low susceptibility level in an instance in which the intrusiveness level of the notification is below a pre-determined intrusiveness level threshold, wherein the notification is initially presented according to one of the following: during the occurrence of the saccade of the user, while the user's eyes are blinking, or at a position on the display that corresponds to the blind spot of the user; and
    maintaining presentation of the notification on the display so as to enable the user to perceive the notification.

2. The method according to claim 1, wherein causing presentation of the notification comprises causing presentation of the notification at a time concurrent with the user having the low susceptibility level.

3. An apparatus comprising a processor and a memory including computer program code, the memory and the computer program code configured to, with the processor, cause the apparatus to:
    determine that a notification should be presented to a user on a display;
    determine an intrusiveness level for presentation of the notification, wherein the intrusiveness level pertains to how intrusive presentation of the notification should be to the user's experience;
    determine a focal point of the user;
    determine a susceptibility level pertaining to the likelihood the user will notice the notification by determining that the user has a low susceptibility level such that there is a low likelihood that the user will notice the notification;
    determine at least one of: an instance in which a saccade of the user occurs, an instance in which the user's eyes are blinking, or a blind spot of the user;
    cause initial presentation of the notification on the display based at least in part on the susceptibility level, the focal point of the user, and the intrusiveness level for presentation of the notification, wherein causing initial presentation of the notification comprises causing initial presentation of the notification on the display while the user has the low susceptibility level in an instance in which the intrusiveness level of the notification is below a pre-determined intrusiveness level threshold, wherein the notification is initially presented according to one of the following: during the occurrence of the saccade of the user, while the user's eyes are blinking, or at a position on the display that corresponds to the blind spot of the user; and maintain presentation of the notification on the display so as to enable the user to perceive the notification.

4. The apparatus of claim 3, wherein the memory and the computer program code are further configured to, with the processor, cause the apparatus to cause presentation of the notification by causing presentation of the notification at a time concurrent with the user having the low susceptibility level.

5. Computer program product comprising a non-transitory computer readable medium having program code portions stored thereon, the program code portions being configured when said program product is run on a computer or network device, to:

determine that a notification should be presented to a user on a display;

determine an intrusiveness level for presentation of the notification, wherein the intrusiveness level pertains to how intrusive presentation of the notification should be to the user's experience;

determine a focal point of the user;

determine a susceptibility level pertaining to the likelihood the user will notice the notification by determining that the user has a low susceptibility level such that there is a low likelihood that the user will notice the notification;

determine at least one of: an instance in which a saccade of the user occurs, an instance in which the user's eyes are blinking, or a blind spot of the user;

cause initial presentation of the notification on the display based at least in part on the susceptibility level, the focal point of the user, and the intrusiveness level for presentation of the notification, wherein causing initial presentation of the notification comprises causing initial presentation of the notification on the display while the user has the low susceptibility level in an instance in which the intrusiveness level of the notification is below a pre-determined intrusiveness level threshold, wherein the notification is initially presented according to one of the following: during the occurrence of the saccade of the user, while the user's eyes are blinking, or at a position on the display that corresponds to the blind spot of the user; and maintaining presentation of the notification on the display so as to enable the user to perceive the notification.

* * * * *